(12) United States Patent
Doria et al.

(10) Patent No.: US 11,093,759 B2
(45) Date of Patent: Aug. 17, 2021

(54) AUTOMATIC IDENTIFICATION OF ROADSIDE OBJECTS FOR LOCALIZATION

(71) Applicant: HERE Global B.V., Eindhoven (NL)

(72) Inventors: David Doria, Oak Park, IL (US); Xin Chen, Evanston, IL (US); Peter Forbes, Chicago, IL (US); David Vandebunte, Oak Park, IL (US)

(73) Assignee: HERE Global B.V., Eindhoven (NL)

( * ) Notice: Subject to any disclaimer, the term of this patent is extended or adjusted under 35 U.S.C. 154(b) by 446 days.

(21) Appl. No.: 15/913,432

(22) Filed: Mar. 6, 2018

(65) Prior Publication Data

US 2019/0279049 A1    Sep. 12, 2019

(51) Int. Cl.
| | |
|---|---|
| *G06K 9/00* | (2006.01) |
| *G06K 9/62* | (2006.01) |
| *G01S 17/89* | (2020.01) |
| *G01S 17/931* | (2020.01) |

(52) U.S. Cl.
CPC ..... *G06K 9/00798* (2013.01); *G06K 9/00201* (2013.01); *G06K 9/00214* (2013.01); *G06K 9/00791* (2013.01); *G06K 9/6276* (2013.01); *G01S 17/89* (2013.01); *G01S 17/931* (2020.01)

(58) Field of Classification Search
CPC ............ G06K 9/6276; G06K 9/00201; G06K 9/00798; G06K 9/00214; G06K 9/00791; G01S 17/931; G01S 17/89
See application file for complete search history.

(56) References Cited

U.S. PATENT DOCUMENTS

| | | | | |
|---|---|---|---|---|
| 5,819,016 | A | * 10/1998 | Watanabe | ............ G01B 11/002 |
| | | | | 345/419 |
| 6,362,817 | B1 | * 3/2002 | Powers | ................... G06T 17/00 |
| | | | | 345/419 |
| 9,046,600 | B2 | 6/2015 | James | |
| 9,285,230 | B1 | * 3/2016 | Silver | ................... G01S 17/931 |
| 9,607,431 | B2 | * 3/2017 | Schlei | ..................... G06T 17/20 |

(Continued)

FOREIGN PATENT DOCUMENTS

| | | |
|---|---|---|
| DE | PE102007007540 A1 | 8/2008 |
| DE | 102011014699 | 9/2012 |

OTHER PUBLICATIONS

Bogdan Rusu, Radu, et al. "Leaving Flatland: Efficient Real-Time Three-Dimensional Perception and Motion Planning." Journal of Field Robotics 26(10). 2006. (pp. 841-862).

(Continued)

*Primary Examiner* — Xuemei G Chen
(74) *Attorney, Agent, or Firm* — Lempia Summerfield Katz LLC

(57) ABSTRACT

Embodiments include apparatus and methods for automatic generation of object polylines that represent roadside objects at a region of a roadway and automatic localization based on the object polylines. Object polylines are generated based on occupied voxels closest to the roadway of one or more voxel occupancy grids associated with the region of the roadway. The object polylines are stored in a database and associated with the region of the roadway. Sensor data from a user located at the region of the roadway is received. The accessed object polylines and the received sensor data are compared. Based on the comparison, localization of the user located at the region of the roadway is performed.

17 Claims, 16 Drawing Sheets

(56) References Cited

U.S. PATENT DOCUMENTS

| | | | |
|---|---|---|---|
| 9,612,123 | B1 | 4/2017 | Levinson et al. |
| 9,697,606 | B2* | 7/2017 | Stout .................. G06K 9/00805 |
| 9,767,366 | B1* | 9/2017 | Fairfield ............. G05D 1/0253 |
| 9,775,582 | B2* | 10/2017 | Chang ...................... A61B 6/56 |
| 10,176,589 | B2* | 1/2019 | Taguchi ................. G06T 5/005 |
| 10,397,861 | B2* | 8/2019 | Konishi ................ G08G 1/091 |
| 10,496,104 | B1* | 12/2019 | Liu ............................ G01S 5/16 |
| 10,552,689 | B2* | 2/2020 | Doria ..................... G01S 17/89 |
| 10,694,210 | B2* | 6/2020 | Chou ..................... H04N 19/96 |
| 10,817,734 | B2* | 10/2020 | Sano ................. G06K 9/00805 |
| 2006/0178828 | A1 | 8/2006 | Moravec |
| 2007/0076920 | A1 | 4/2007 | Ofek |
| 2008/0253688 | A1* | 10/2008 | Safra ...................... G01C 21/32 382/294 |
| 2010/0207936 | A1 | 8/2010 | Minear |
| 2011/0074766 | A1* | 3/2011 | Page ....................... G06T 17/05 345/419 |
| 2011/0279452 | A1 | 11/2011 | Ibe |
| 2012/0256916 | A1* | 10/2012 | Kitamura ............... G01B 11/24 345/419 |
| 2012/0310516 | A1 | 12/2012 | Zeng |
| 2013/0169685 | A1 | 7/2013 | Lynch |
| 2014/0309841 | A1* | 10/2014 | Hara ..................... G05D 1/0274 701/26 |
| 2014/0368807 | A1 | 12/2014 | Rogan |
| 2015/0120244 | A1 | 4/2015 | Ma |
| 2015/0123969 | A1* | 5/2015 | Wang ....................... G06T 15/08 345/424 |
| 2015/0198711 | A1 | 7/2015 | Zeng et al. |
| 2015/0268058 | A1 | 9/2015 | Samarasekera |
| 2015/0293216 | A1 | 10/2015 | Odea |
| 2016/0137207 | A1 | 5/2016 | Vanholme |
| 2016/0154999 | A1 | 6/2016 | Fan |
| 2016/0267331 | A1 | 9/2016 | Pillai |
| 2017/0003685 | A1 | 1/2017 | Pollock |
| 2017/0116487 | A1 | 4/2017 | Yamazaki et al. |
| 2017/0116781 | A1 | 4/2017 | Babahajiani |
| 2017/0270361 | A1 | 9/2017 | Puttagunta |
| 2017/0277197 | A1 | 9/2017 | Liao |
| 2017/0294026 | A1* | 10/2017 | Choi ..................... G01S 17/89 |
| 2018/0058861 | A1* | 3/2018 | Doria ................... G01S 7/4808 |
| 2018/0121750 | A1* | 5/2018 | Borkowski ........ G06K 9/00805 |
| 2018/0165544 | A1 | 6/2018 | Isert |
| 2018/0189578 | A1* | 7/2018 | Yang ..................... G06K 9/4638 |
| 2018/0203124 | A1* | 7/2018 | Izzat ..................... G01S 13/865 |
| 2018/0225515 | A1 | 8/2018 | Jiang |
| 2018/0232583 | A1* | 8/2018 | Wang ..................... G06K 9/628 |
| 2018/0276483 | A1* | 9/2018 | Zeng ........................ G06T 7/13 |
| 2018/0357907 | A1* | 12/2018 | Reiley ..................... G08G 1/202 |
| 2018/0364717 | A1* | 12/2018 | Douillard ............. G05D 1/0212 |
| 2019/0050000 | A1* | 2/2019 | Kennedy ................. G06T 7/277 |
| 2019/0120964 | A1* | 4/2019 | Luo .......................... G01S 17/86 |
| 2019/0162856 | A1* | 5/2019 | Atalla ..................... G01S 17/86 |
| 2019/0163958 | A1* | 5/2019 | Li ........................ G06K 9/0063 |
| 2019/0195998 | A1* | 6/2019 | Campbell ............... G01S 13/89 |
| 2019/0266741 | A1* | 8/2019 | Uehara .................. G01S 17/931 |
| 2019/0356850 | A1* | 11/2019 | Ashrafi ..................... H04N 5/77 |
| 2020/0019794 | A1* | 1/2020 | Engelcke ............. G06N 3/0454 |
| 2020/0025873 | A1* | 1/2020 | Kubertschak ............. G01S 7/40 |
| 2020/0098135 | A1* | 3/2020 | Ganjineh .................. G06T 7/74 |
| 2020/0117220 | A1* | 4/2020 | Paglieroni ............ G08G 5/0039 |
| 2020/0124731 | A1* | 4/2020 | Xiong ........................ G06T 7/11 |
| 2020/0156663 | A1* | 5/2020 | Alvarez ............ G01C 21/3691 |

OTHER PUBLICATIONS

PCT International Search Report and Written Opinion of International Searching Authority dated Apr. 26, 2019 corresponding to PCT International Application No. PCT/US2019/015371 filed Jan. 28, 2019.

Andrei Vatavu et al., "Environment Perception Using Dynamic Polylines and Particle Based Occupancy Grids", 2011 IEEE International Conference on Intelligent Computer Communication and Processing, Aug. 2011, 7 pages.

Andrei Vatavu et al., "Real Time Environment Representation in Driving Scenarios Based on Object Delimiters Extraction", Informatics in Control Automation and Robotics, 2011, pp. 255-267, vol. 85.

Carlos Galvez Del Postigo Fernandez, "Grid-Based Multi-Sensor Fusion for On-Road Obstacle Detection: Application to Autonomous Driving", Master's Thesis at KTH-CVAP and Volvo Car Corporation, Aug. 2015, 158 pages, Stockholm, Sweden.

Markus Hammarsten et al., "3D Localization and Mapping Using Automotive Radar", Chalmers University of Technology, Department of Signals and Systems, 2016, 108 pages, Gothenburg, Sweden.

Chen, Xin, et al. "Next generation map making: geo-referenced ground-level LIDAR point clouds for automatic retro-reflective road feature extraction." Proceedings of the 17th ACM SIGSPATIAL International Conference in Advances on Geographic Information Systems. ACM, 2009. (pp. 1-4).

European Search Report for corresponding Application No. 171872823-1206, dated Feb. 1, 2018.

Hata, Alberto, and Denis Wolf. "Road marking detection using LIDAR reflective intensity data and its application to vehicle localization." 17th International IEEE Conference on Intelligent Transportation Systems (ITSC). IEEE, 2014. (pp. 1-6).

Levinson, Jesse, and Sebastian Thrun. "Robust vehicle localization in urban environments using probabilistic maps." Robotics and Automation (ICRA), 2010 IEEE International Conference on. IEEE, 2010. (pp. 1-7).

Zhao, Gangqiang, and Junsong Yuan. "Curb detection and tracking using 3D-LIDAR scanner." 2012 19th IEEE International Conference on Image Processing. IEEE, 2012.

* cited by examiner

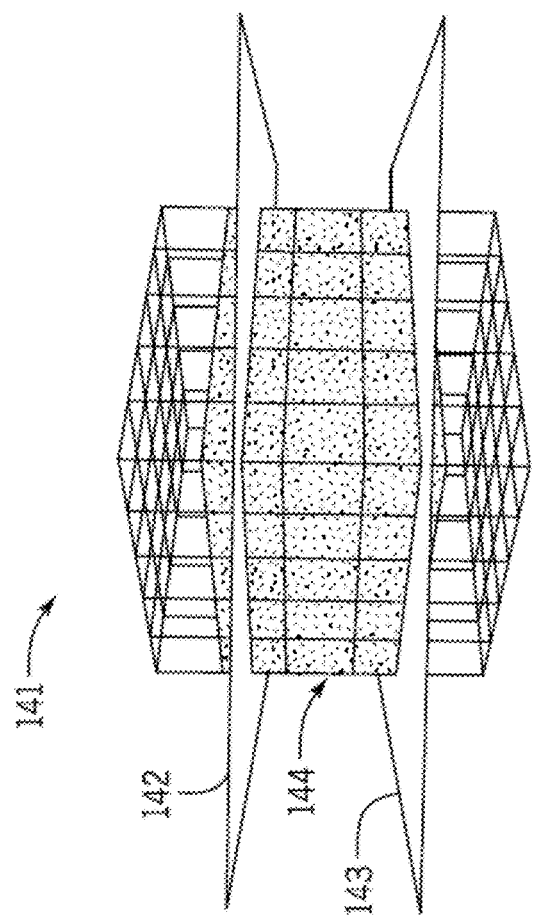
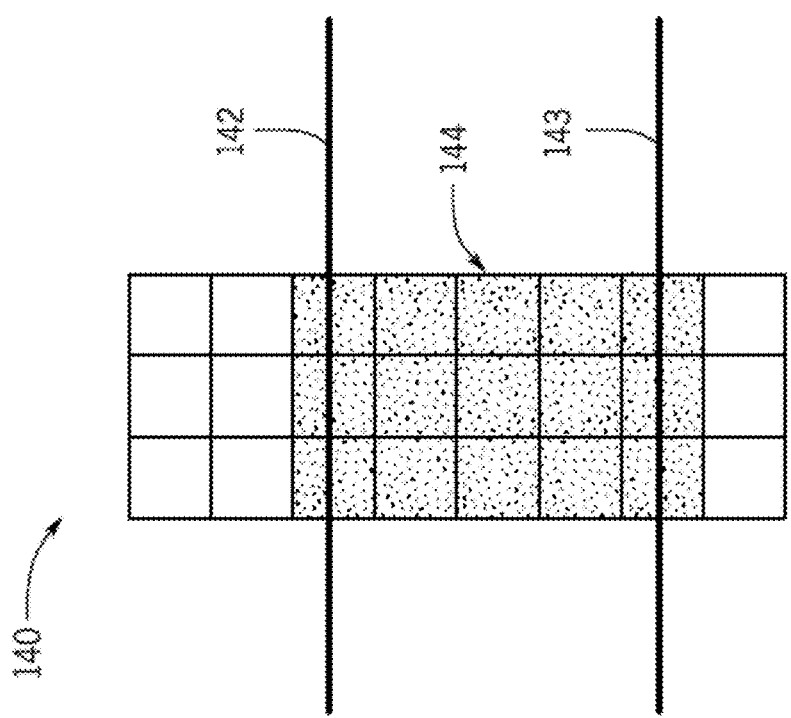

AUTOMATIC IDENTIFICATION OF ROADSIDE OBJECTS FOR LOCALIZATION

FIELD

The following disclosure relates to identification of occupancy grids of a vicinity of a roadway and generation of object polylines that represent roadside objects at the vicinity of the roadway, and in addition, applications for localization at the vicinity of the roadway based on the generated object polylines.

BACKGROUND

The Global Positioning System (GPS) or another global navigation satellite system (GNSS) provides location information to a receiving device anywhere on Earth as long as the device has a substantial line of sight without significant obstruction to three or four satellites of the system. The GPS system is maintained and made available by the United States government. Originally, the government retained exclusive use of GPS. Over time increasing levels of accuracy of the GPS signals were made available to the public.

Accuracy of the GPS system alone is about 50 feet or 15 meters. The accuracy may be augmented using secondary techniques or systems such as the Wide Area Augmentation System (WAAS), Differential GPS (DGPS), inertial navigation systems (INS) and Assisted GPS. WAAS and DGPS improve accuracy using ground stations that transmit position information. INS utilizes internal sensors at the receiving device for improving the accuracy of GPS.

However, some applications require greater accuracies than obtainable with GPS, even with enhanced accuracy techniques. For example, in high definition mapping and navigating applications, the receiving device may be placed on a map in a three-dimensional view with greater accuracy than that obtainable from GPS techniques. Localization techniques that match a location to a map or environment face additional challenges in improving this accuracy.

SUMMARY

In one embodiment, a method is provided for automatic identification of roadside objects. One or more voxel occupancy grids associated with a region of a roadway is identified. A voxel occupancy grid of the one or more voxel occupancy grids includes a plurality of grid voxels. Occupied voxels closest to the roadway for the plurality of grid voxels of the one or more voxel occupancy grids are determined. An object polyline that connects respective pre-defined points of respective occupied voxels closest to the roadway for the one or more voxel occupancy grids is generated. The generated object polyline is classified as a roadside object.

In another embodiment, a method is provided for automatic localization. Object polylines associated with a region of a roadway are accessed. The object polylines represent roadside objects at the region of the roadway. The object polylines are generated based on occupied voxels closest to the roadway of one or more voxel occupancy grids associated with the region of the roadway. Sensor data from a user located at the region of the roadway is received. The accessed object polylines and the received sensor data are compared. Based on the comparison, localization of the user located at the region of the roadway is performed.

In another embodiment, an apparatus is provided for automatic detection of roadside objects. The apparatus includes a communication interface and a controller. The communication interface receives a voxel occupancy grid associated with a region of a roadway. The voxel occupancy grid includes a plurality of grid voxels. The controller extracts portions of the voxel occupancy grid based on a size criterion and determines occupied voxels closest to the roadway in the non-extracted portions of the voxel occupancy grid. The controller also generates, for the non-extracted portions of the voxel occupancy grid, at least one object polyline that represents a roadside object at the region of the roadway.

In another embodiment, an apparatus is provided for automatic localization. The apparatus includes a database, a communication interface, and a controller. The database stores object polylines associated with a region of a roadway. The object polylines represent roadside objects at the region of the roadway. The communication interface receives sensor data from a user located at the region of the roadway. The controller compares the stored object polylines and the received sensor data and performs localization of the user located at the region of the roadway based on the comparison.

BRIEF DESCRIPTION OF THE DRAWINGS

Exemplary embodiments of the present invention are described herein with reference to the following drawings.

FIGS. 3A and 3B illustrate examples of occupancy grids filtered by height.

DETAILED DESCRIPTION

Figure 1:
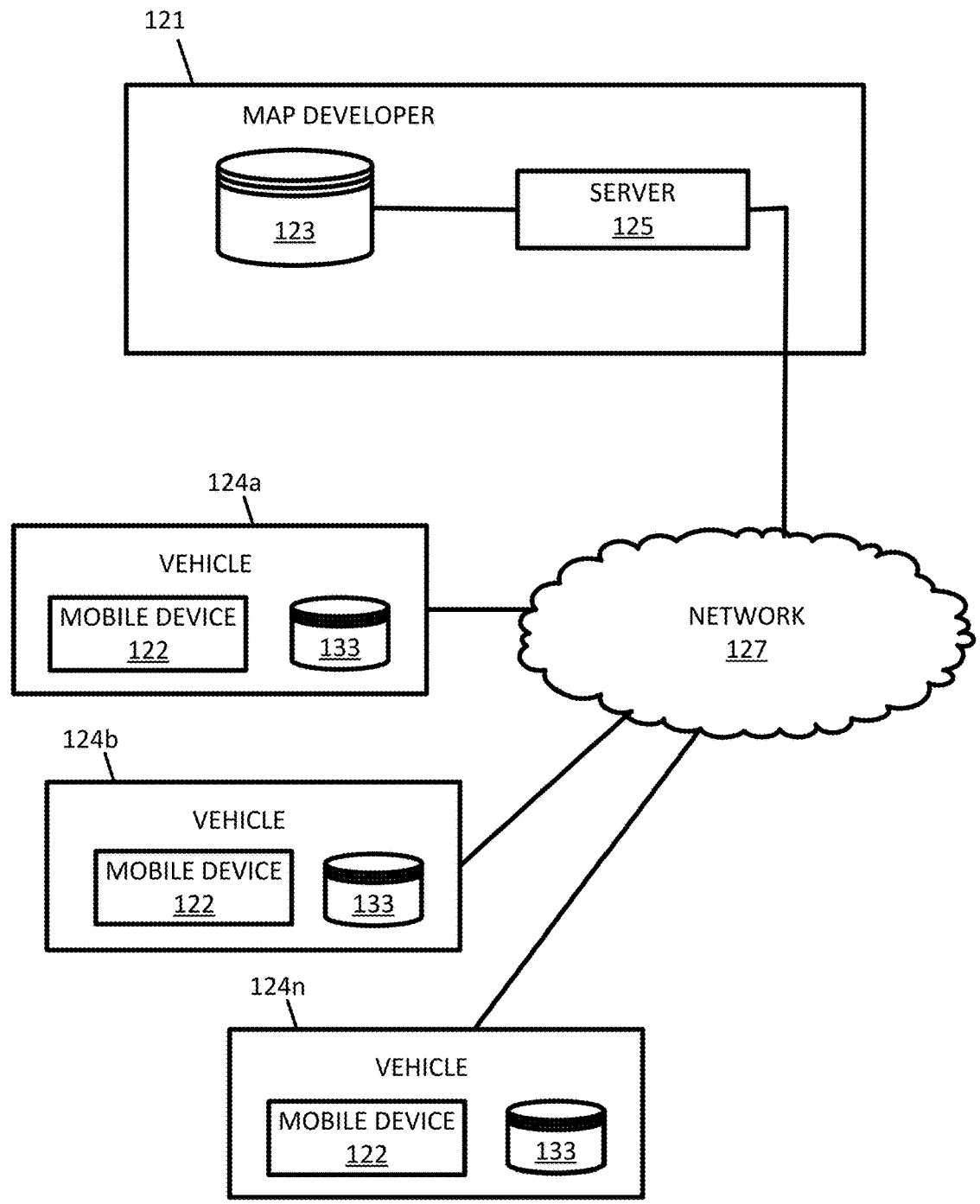
FIG. 1 illustrates an example system for generating, identifying, and classifying object polylines.

Example applications that utilize location data and benefit from increases in positional accuracy include localization applications, three-dimensional (3D) applications, and building modeling applications. Localization applications may include a category of applications that match a set of observed data collected at a location to a known model of the surroundings. For example, the surroundings at any point may provide a signature of the location. Three-dimensional applications may include any application that provides a 3D model and places a location with that model. Example 3D applications include augmented reality, 3D navigation, and 3D mapping. Building modeling applications may include models of buildings, indoor environments, or architecture that are matched with a detected location.

One example of a localization application is autonomous vehicle technology, where autonomous driving relies on 3D object detection. To take advantage of high definition 3D maps, autonomous vehicles may sense the environment and match detected objects or features to a map using a localization process. The localization process relies on pertinent structures in the world being present in the map. One problem for certain localization applications, such as autonomous vehicles, is often addressed by developing "object detectors" for each specific object that has been deemed useful for localization. For example, a map developer might develop a "pole detector" to populate all of the poles in the world on a map, a "guardrail detector" to populate all of the guardrails in the world on the map, and a "sign detector" to populate all of the signs in the world on the map. Each of these detectors takes an enormous amount of development effort, computing resources, and training data, and introduces substantial complexity into a map building system. There is a need to continue to enable localization without explicit individual object detection algorithms. The following embodiments provide techniques to populate some of these objects without the development effort, computing resources, or training data, and creates a simpler and more efficient map building system.

The following embodiments provide improvements for positional accuracy and identifying objects, or obstacles, within 3D voxel occupancy grids using polylines that represent the objects. A 3D occupancy grid is a volumetric grid representing a 3D space. The volumetric grid includes a plurality of voxels that each represents a portion of the 3D space. In one example, the voxels include the positional location of the voxel and data indicative of whether the portion of the 3D space represented by the voxel contains data for an object at that particular portion of the 3D space. Voxels that contain data indicative of an object at the 3D space represented by that voxel may be referred to as an "occupied voxel." Likewise, a voxel containing no data for an object at the 3D space represented by that voxel may be referred to as an "unoccupied voxel." In another example, the voxel data includes the position within the voxel for objects within the voxel. Alternatively, the voxels may not be encoded with relative position in the grid. The voxels may be ordered in a logical sequence in which the sequence conveys the relative position in the grid.

An object polyline is used to represent a road-facing geometry, or edge, of any type of roadside object. An object polyline may represent all unique road-facing edges of objects near the side of a road, and may be limited to only those roadside objects within a certain distance above the road. In the case of simple vertical objects, such as, for example, walls and posts, a single object polyline may be used to represent the object's entire geometry. In these simple cases, the object polyline runs along either the lower edge of the object (if this falls within any specified height parameter) or any pre-defined points of the voxels that represent the object. The pre-defined point may be, for example, the center point of the voxel. Individual voxels may be converted to points by identifying the voxel point in longitude, latitude, and altitude coordinates. More complex objects that have significant changes in their geometry as one travels along a roadway, for instance, like hills and vegetation, are represented by multiple object polylines. The process of determining the number of object polylines to use when representing an object is dependent on various thresholds as well as the voxel size of the grid used to produce them.

The following embodiments reduce the amount of computing and networking resources required to represent roadside objects of the 3D space and communicate features of the space using the object polylines. Voxels for a 3D space require a vast amount of storage space and bandwidth in order to be communicated in a mobile system. The following embodiments convert voxels arranged in an occupancy grid into object polylines for only certain voxel locations or groups of voxel locations. Only the object polylines may be stored or communicated. Thus, using an object polyline to represent roadside objects greatly reduces the storage and/or bandwidth requirements, since this representation keeps most of the relevant information useful for localization while massively reducing the data size as compared to voxels of a 3D occupancy grid. The following embodiments also reduce the need for developers to develop specific detectors used to detect specific types of roadside objects, since the object polylines can be used to represent all types of roadside objects. Thus, the development effort, computing resources, and/or training data used to develop these specific detectors are minimized.

FIG. 1 illustrates an example system for generating, identifying, and classifying object polylines. In FIG. 1, one or more vehicles 124a, 124b, . . . 124n are connected to the server 125 though the network 127. The vehicles 124a-n may be directly connected to the server 125 or through an associated mobile device 122. A map developer system 121, including the server 125 and a geographic database 123, exchanges (e.g., receives and sends) data from the vehicles 124a-n. The mobile devices 122 include databases 133 corresponding to a local map, which may be modified according to the server 125. The mobile device 124a-n may be standalone device such as smartphones or devices integrated with vehicles. Additional, different, or fewer components may be included.

One of the vehicles 124 may be a collection vehicle, which is discussed in more detail below with respect to FIG. 12. The collection vehicle may include one or more distance data collection device or sensor, such as a light detection and ranging (LiDAR) device. The distance data collection sensor may generate point cloud data. The distance data collection sensor may include a laser range finder that rotates a mirror directing a laser to the surroundings or vicinity of the collection vehicle on a roadway or another collection device on any type of pathway. Other types of pathways may be substituted for the roadway in any embodiment described herein.

The mobile device 122 and/or the server 125 identifies one or more voxel occupancy grids associated with a region of a roadway. As described above, an occupancy grid is a volumetric grid representing a 3D space. The volumetric grid includes a plurality of voxels that each represents a portion of the 3D space. A voxel occupancy grid may include one or more rows and one or more vertical layers of grid voxels. To identify a voxel occupancy grid, the mobile device 122 and/or the server 125 receives point cloud data collected by a distance sensor and describing the vicinity of the region of the roadway. The point cloud is formed of points or pixels, each of which may include an intensity and location data. The location data may be a three component coordinate (e.g., [x, y, z]) or a direction and a distance. The direction may be defined as a first angle from a two reference planes (e.g., [alpha, beta, distance]), or as a direction of travel. The reference planes may be a horizontal plane parallel to the surface of the Earth and a vertical plane perpendicular to the surface of the Earth.

The mobile device 122 and/or the server 125 may exclude point cloud data associated with a road surface at the region of the roadway. For example, the mobile device 122 and/or the server 125 may filter out or remove data points from the point cloud corresponding to the roadway. The road surface may be defined as the area between the edges of the roadway. The remaining point cloud data represents the environment at the region of the roadway on each side of the road surface. The point cloud data may be filtered according to other parameters. The point cloud data may also be reduced by a threshold distance in each dimension. The mobile device 122 and/or the server 125 identifies a voxel occupancy grid as the portion of the point cloud data associated with a side of the road surface at the region of the roadway. The voxel occupancy grid may also represent both sides of the road surface at the region of the roadway.

The mobile device 122 and/or the server 125 may extract portions of the identified voxel occupancy grids associated with the region of roadway. A portion of an occupancy grid may be the entire occupancy grid or may be only part of the occupancy grid. The extraction may be based on a size criterion. For example, any voxel occupancy grid having less than a predetermined number of voxels may be extracted, or discarded. The predetermined number of voxels may be, for example, 20 voxels. Other predetermined numbers of voxels may be used (e.g., 5, 10, 25, 50, 100, 256 or another number). Extracted or discarded voxel occupancy grids are not utilized by the mobile device 122 and/or the server 125 in the system for generating, identifying, and classifying object polylines, such as the system of FIG. 1. Extracting portions of voxel occupancy grids does not take into account the dimensions of the grid (e.g., whether the grid is 2×3×3 or 1×1×19). All occupancy grids that meet this size criterion are discarded.

Each identified voxel occupancy grid may also be filtered using two steps of morphological filtering. A first step may be a morphological close step, which is used to fill holes and gaps in the occupancy grids that were identified. A morphological close step may be used to make objects that may be sampled sparsely (e.g. chain-link or wire fences) appear as continuous objects. Removing gaps due to sampling of these objects may allow to produce more accurate object polylines from the occupancy grids containing such sparsely sampled objects. A second step may be a morphological open step, which is used to remove single-voxel grids. Each step may use a 26-neighborhood of each voxel when computing the results of component erosions and dilations (i.e., use a full 3×3×3 kernel).

Extracting portions of the voxel occupancy grids based on a size criterion may also include extracting grid voxels of the voxel occupancy grids based on a height of the voxel occupancy grids above the road surface at the region of the roadway. To do so, the mobile device 122 and/or the server 125 identifies a predetermined height range for which to exclude occupancy grids. The mobile device 122 and/or the server 125 then determines a height above the road surface at the region of the roadway for each of the voxel occupancy grids and filters out grid voxels of each of the voxel occupancy grids that fall outside the predetermined height range. Determining the height of an occupancy grid above the road surface is described in more detail below in reference to FIG. 2. Examples of occupancy grids filtered by height are described in more detail below in reference to FIGS. 3A and 3B.

The mobile device 122 and/or the server 125 determines which voxels of the voxel occupancy grid are occupied. As discussed above, an "occupied" voxel is a voxel that contains data indicative of an object at the 3D space represented by that voxel. Similarly, an "unoccupied" voxel is a voxel containing no data for an object at the 3D space represented by that voxel. The voxel occupancy may be a binary indication (e.g., 1 or 0, on or off) that the voxel has been included to represent an object at the 3D space. The mobile device 122 and/or the server 125 then determines which of the determined occupied voxels are closest to the roadway. This determination is made for each layer of each identified voxel occupancy grid that has not been extracted, and is described in more detail below in reference to FIG. 4. This determination may also be made for only a predetermined number of layers of the identified voxel occupancy grids. Occupied voxels closest to the roadway may be referred to as "front voxels."

After determining and identifying the occupied voxels closest to the roadway, or front voxels, object polylines are generated for each layer of each identified voxel occupancy grid that has not been extracted. In another embodiment, object polylines are only generated for a predetermined number of layers of the identified voxel occupancy grids. The mobile device 122 and/or the server 125 may generate object polylines by connecting respective pre-defined points of respective front voxels within each layer. For each layer of grid voxels, the mobile device 122 and/or the server 125 identifies a pre-defined point in each front voxel in increasing order in a direction of travel along the roadway. The pre-defined point may be the center point of each grid voxel. However, the pre-defined point may be any point within a grid voxel. The mobile device 122 and/or the server 125 may convert individual voxels to points by identifying the voxel point in longitude, latitude, and altitude coordinates. The mobile device 122 and/or the server 125 then connects the pre-defined points of the grid voxels to form an object polyline when the pre-defined points are adjacent to and within one voxel distance of each other. This is described in more detail below in reference to FIG. 6.

In one embodiment, the mobile device 122 and/or the server 125 classifies the generated object polyline as a roadside object. In another embodiment, the mobile device 122 and/or the server 125 classifies the generated object polyline as noise, and is discarded. In order to classify the object polylines, the mobile device 122 and/or the server 125 may compute polyline attributes for each generated object polyline. The classification of the object polylines may be based on the polyline attributes. Example polyline attributes may include a length ratio, which is the ratio of the straight-line distance between the first and last point in the object polyline and the distance between the first and last point of the object polyline when walking, or tracing, the polyline. For example, straight polylines may have a value of 1.0 and decrease as the curvature, or noise, of the object polyline increases. Another example polyline attribute is the variance of the x-coordinates of the object polyline, where x is the axis perpendicular to the direction of the roadway within the same plane as the roadway. This may also be expressed as a variance of the lateral distance from the roadway. Other variance-related polyline attributes include a first derivative variance, which is the variance of the derivatives of each line segment of the object polyline, and a second derivative variance, which is the variance of the derivatives of each line segment without including segments with a slope of zero (0). Each occupancy grid used to generate object polylines are aligned to a direction of the roadway. Derivatives of each line segment of an object polyline may correspond to orientation values for object polylines embedded in a road-aligned coordinate system. For example, line segments in individual object polylines will either be oriented parallel to the roadway, away from the roadway, or towards the roadway. These orientations may be given values of 0, 1, and −1, respectively. These values would correspond to the derivatives of the line segments of an object polyline. The polyline attributes may also include a normalized difference, which is computed as the sum of absolute differences in x between neighboring voxels over the width of the object polyline. Another example polyline attribute is the distance between the object polyline and the closest road boundary point. The height of the object polyline above the roadway (i.e., base height) may also be a polyline attribute. Another example polyline attribute is the segment length, which is the length of the object polyline computed as the distance between the start and end points of the object polyline.

The mobile device 122 and/or the server 125 may store the computed polyline attributes and the object polyline classifications in a database 123 or 133. The mobile device 122 and/or the server 125 may filter individual object polylines as "noise" based on their polyline attributes. This ensures that the retained object polylines contain relevant information and correspond to objects useful for localization. Objects useful for localization are objects that easily detectable, uniquely define or represent the location of the object, and objects that will not change frequently. Some examples of objects useful for localization include long, continuous objects on or near a roadway, such as guardrails and barriers, or other larger structures, such as buildings, bridges, and larger roadside signs. One example of a barrier may be a jersey barrier, which is a modular concrete or plastic barrier often used to separate lanes of traffic, reroute traffic, or protect pedestrians or construction workers. Objects not useful for localization are objects that are temporary and objects that do not uniquely identify a particular location. Some examples of objects not useful for localization include temporary objects, such as pedestrians or animals on or near a roadway, some vegetation that are not unique to a particular location, such as shrubbery, leaves or small branches of a tree, certain geographical features, and small objects, such as poles and hydrants. Filtering object polylines as noise, either based on their polyline attributes or their similarity to other polylines in adjacent vertical layers of grid voxels, reduces the amount of computing and networking resources required to represent roadside objects of the 3D space and improves the ability to communicate features of the space using the object polylines more efficiently. One example of filtering includes thresholding the polyline attributes against learned parameters in a decision tree. This technique of filtering involves machine learning and may utilize neural networks.

The mobile device 122 and/or the server 125 may provide the generated and classified object polylines to content providers, such as a map developer 121 or an applications developer, to include the object polylines in detailed maps of locations or applications, such as mobile applications, using location related information. The object polylines may also be provided to end users, such as other mobile devices 122 or vehicles 124, in order to perform localization techniques. The object polylines may be provided to other various services or providers as well, such as navigational services or traffic server providers. The object polylines may also be provided for non-localization functions, such as being provided to highway engineers to identify areas not containing any roadside objects. The object polylines may be provided in a binary file format.

Figure 2:
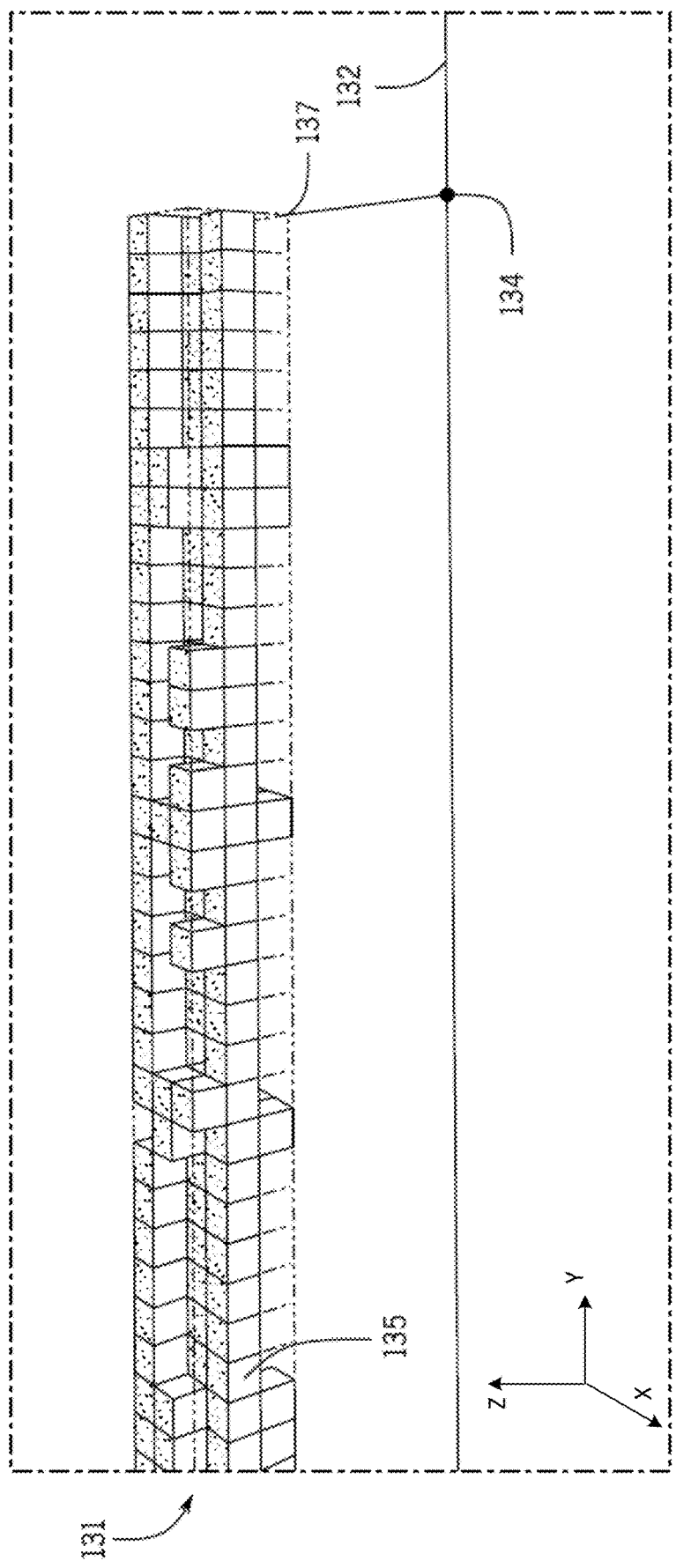
FIG. 2 illustrates an example occupancy grid at a region of a roadway.

FIG. 2 illustrates an example occupancy grid 131 at a region of a roadway. The mobile device 122 and/or the server 125 may determine a base height of the occupancy grid 131 above the road surface 132 at the region of the roadway. An occupancy grid base height may be a single value defining the height of an occupancy grid 131 above the road surface 132. A local flatness assumption may be made regarding the occupancy grid base height. This means that the occupancy grid base height corresponds uniformly to the base of the occupancy grid 131 regardless of the actual height of the grid voxels above the road surface 132. To determine this value, the mobile device 122 and/or the server 125 identifies a grid corner 137 in closest proximity to the road surface 132. The mobile device 122 and/or the server 125 then determines a point 134 on the road surface 132 nearest the identified grid corner 137. The mobile device 122 and/or the server 125 calculates the difference in altitude (i.e., the z-direction as shown in FIG. 2) between the identified grid corner 137 and the point 134 on the road surface 132. The occupancy grid 131 of FIG. 2 includes occupied grid voxels, such as voxel 135, and unoccupied grid voxels, such as the grid voxel containing the grid corner 137.

FIGS. 3A and 3B illustrate examples of voxel occupancy grids 140 and 141 filtered by height. As discussed above, the mobile device 122 and/or the server 125 may extract portions of the identified voxel occupancy grids based on a height criterion. The portions of the voxel occupancy grids excluded may be the entire voxel occupancy grid or only those grid voxels of the voxel occupancy grids that fall outside the predetermined height range. As shown in FIGS. 3A and 3B, the predetermined height range is indicated by an upper height range limit 142 and a lower height range limit 143. The shaded voxels 144 represent the voxels retained after the mobile device 122 and/or the server 125 filters out grid voxels that fall outside the predetermined height range. In one example, the lower height range limit 143 is 30 centimeters and the upper height range limit 142 is 150 centimeters. However, the upper and lower height range limits 142, 143 may be any predetermined heights above the road surface.

Figure 4:
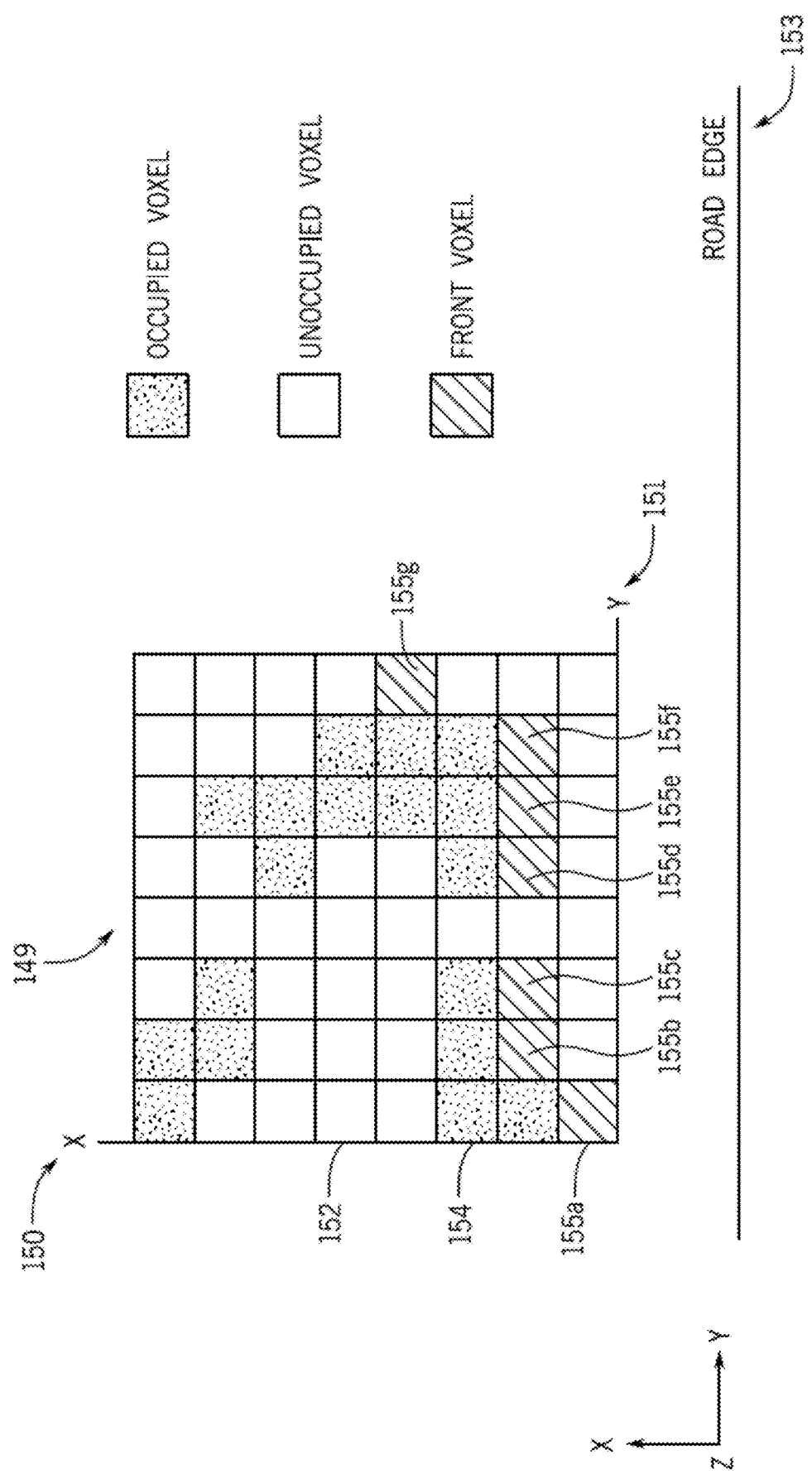
FIG. 4 illustrates an example of a single layer of an occupancy grid in a horizontal plane with front voxels highlighted.

FIG. 4 illustrates an example of a single layer of an occupancy grid 149 in a horizontal plane with front voxels 155a-g identified. As discussed above, the mobile device 122 and/or the server 125 determines front voxels for each layer of an occupancy grid. Front voxels are defined as the occupied voxels 154 closest to a nearest edge 153 of the roadway in each layer of a voxel occupancy grid. The occupancy grid 149 of FIG. 4 contains both occupied voxels 154 and unoccupied voxels 152. To determine the front voxels 155a-g, the mobile device 122 and/or the server 125 first defines a horizontal plane parallel to the surface of the Earth and a vertical plane perpendicular to the surface of the Earth. The vertical plan may be defined as parallel to the direction of gravity. The mobile device 122 and/or the server 125 then defines a first direction 151 as a direction of travel along the roadway. The mobile device 122 and/or the server 125 also defines a second direction 150 as a lateral direction perpendicular to the first direction 151. Both the first direction 151 and second direction 150 are in the horizontal plane. Each grid voxel of the one or more rows of grid voxels may include row coordinate points that indicate the position of the grid voxel in each of the first direction 151 and second direction 150. The occupancy grid 149 of FIG. 4 is an 8×8 grid, meaning the occupancy grid 149 has 8 rows of adjacent grid voxels extending in both the first and second directions 151, 150. The row coordinate points may be indicated by ([row]$_2$, [row]$_1$), where "[row]" is the incremental row number and the subscript numbers indicate whether the row is a row of adjacent grid voxels extending in the first or second direction 151, 150. For example, the row coordinate points "(7$_2$, 6$_1$)" for a particular voxel indicates that the voxel is in the seventh row of rows of adjacent grid voxels extending in the second direction and the sixth row of rows of adjacent grid voxels extending in the first direction. The row coordinate points may be displayed in any order. For the example above, the row coordinate points may also be displayed as "(6$_1$, 7$_2$)." The row coordinate points for each grid voxel of an 8×8 occupancy grid like the occupancy grid 149 of FIG. 4 are shown in Table 1 below.

TABLE 1

| | | | | | | | |
|---|---|---|---|---|---|---|---|
| (1$_2$, 8$_1$) | (2$_2$, 8$_1$) | (3$_2$, 8$_1$) | (4$_2$, 8$_1$) | (5$_2$, 8$_1$) | (6$_2$, 8$_1$) | (7$_2$, 8$_1$) | (8$_2$, 8$_1$) |
| (1$_2$, 7$_1$) | (2$_2$, 7$_1$) | (3$_2$, 7$_1$) | (4$_2$, 7$_1$) | (5$_2$, 7$_1$) | (6$_2$, 7$_1$) | (7$_2$, 7$_1$) | (8$_2$, 7$_1$) |
| (1$_2$, 6$_1$) | (2$_2$, 6$_1$) | (3$_2$, 6$_1$) | (4$_2$, 6$_1$) | (5$_2$, 6$_1$) | (6$_2$, 6$_1$) | (7$_2$, 6$_1$) | (8$_2$, 6$_1$) |
| (1$_2$, 5$_1$) | (2$_2$, 5$_1$) | (3$_2$, 5$_1$) | (4$_2$, 5$_1$) | (5$_2$, 5$_1$) | (6$_2$, 5$_1$) | (7$_2$, 5$_1$) | (8$_2$, 5$_1$) |
| (1$_2$, 4$_1$) | (2$_2$, 4$_1$) | (3$_2$, 4$_1$) | (4$_2$, 4$_1$) | (5$_2$, 4$_1$) | (6$_2$, 4$_1$) | (7$_2$, 4$_1$) | (8$_2$, 4$_1$) |
| (1$_2$, 3$_1$) | (2$_2$, 3$_1$) | (3$_2$, 3$_1$) | (4$_2$, 3$_1$) | (5$_2$, 3$_1$) | (6$_2$, 3$_1$) | (7$_2$, 3$_1$) | (8$_2$, 3$_1$) |
| (1$_2$, 2$_1$) | (2$_2$, 2$_1$) | (3$_2$, 2$_1$) | (4$_2$, 2$_1$) | (5$_2$, 2$_1$) | (6$_2$, 2$_1$) | (7$_2$, 2$_1$) | (8$_2$, 2$_1$) |
| (1$_2$, 1$_1$) | (2$_2$, 1$_1$) | (3$_2$, 1$_1$) | (4$_2$, 1$_1$) | (5$_2$, 1$_1$) | (6$_2$, 1$_1$) | (7$_2$, 1$_1$) | (8$_2$, 1$_1$) |

The mobile device 122 and/or the server 125 may also define a third direction as a road surface normal direction perpendicular to the first and second directions 151, 150. The third direction is in the vertical plane. Each grid voxel of the one or more vertical layers of grid voxels may include a layer coordinate point that indicates the position of the grid voxel in the third direction. The layer coordinate point may be a single value, and may be indicated along with the row coordinate points. Using the example above, if the grid voxel having the row coordinate points "(7$_2$, 6$_1$)" was in the third layer of grid voxels, the number "3" may indicate the layer coordinate point. In this example, the row and layer coordinate points may be indicated as "(7$_2$, 6$_1$, 3)."

The mobile device 122 and/or the server 125 determines whether each grid voxel of the voxel occupancy grid 149 is an occupied voxel 154 or an unoccupied voxel 152. As discussed above, an occupied voxel 154 is a grid voxel that represents a portion of a 3D space containing data for an object at that portion of the 3D space and an unoccupied voxel 152 is a grid voxel that represents a portion of the 3D space containing no data for an object at that portion of the 3D space. For each determined occupied voxel 154, the mobile device 122 and/or the server 125 measures a distance in the second direction 150 from the nearest edge 153 of the roadway. For each row of grid voxels extending in the second direction 150 and for each layer of grid voxels in the third direction, the mobile device 122 and/or the server 125 defines front voxels 155a-g as the occupied voxel 154 in a particular row having a minimum measured distance in the second direction 150. There may be rows that consist only of unoccupied voxels 152, in which case that particular row would not have a front voxel 155. The fourth row of FIG. 4 as you move in the first direction 151 (i.e., the fourth row of adjacent grid voxels extending in the second direction 150, which is between front voxels 155c and 155d) is an example of a row that does not have a front voxel 155, since that row contains only unoccupied voxels 152.

Figure 5:
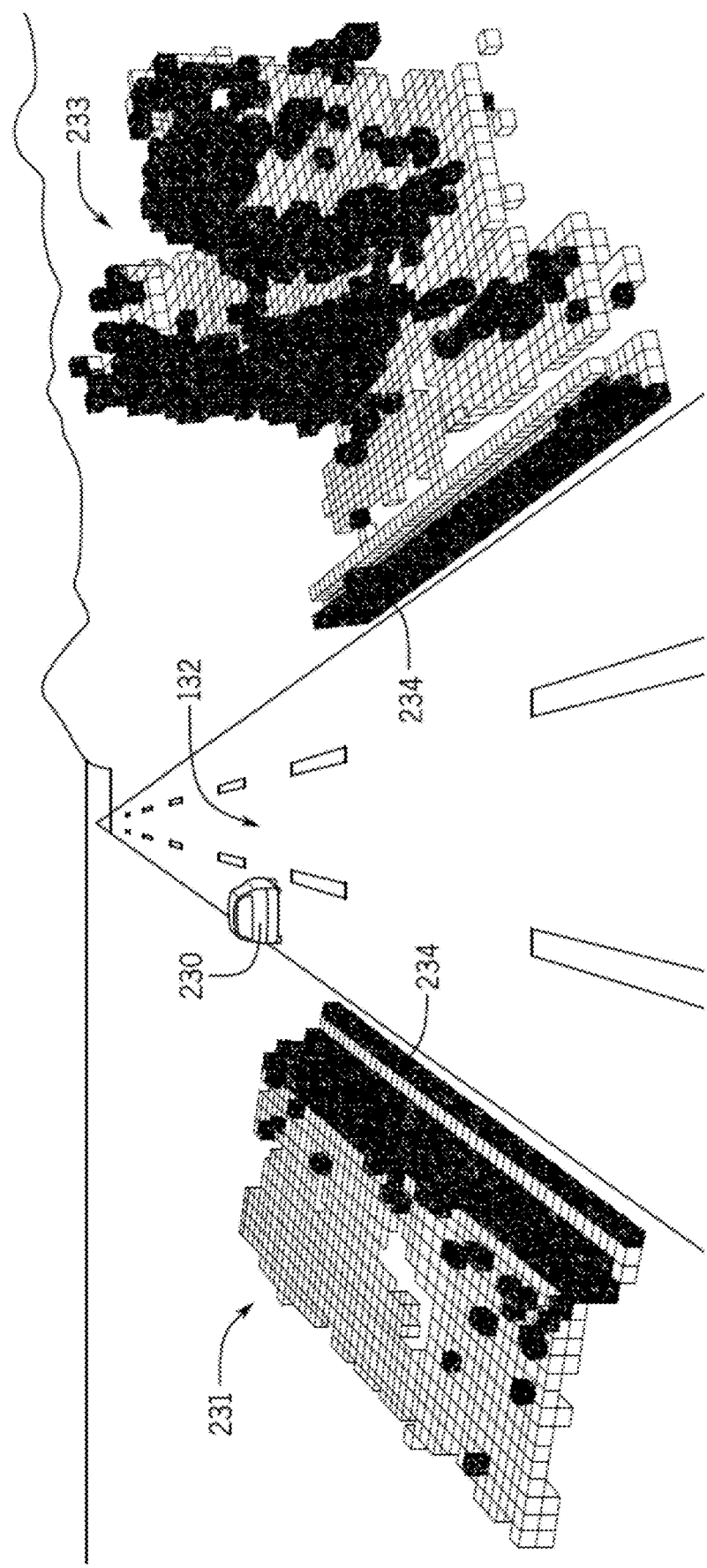
FIG. 5 illustrates example occupancy grids at a region of a roadway with front voxels highlighted.

FIG. 5 illustrates example occupancy grids 231, 233 at a region of a roadway 132 with front voxels 234 highlighted. The roadway 132 is associated with occupancy grids at specific locations. In one example, a set of occupancy grids is stored for each predetermined section of road, or chunk, of the roadway 132. For example, the vehicle 230 of FIG. 5 is traveling at a particular location of the roadway 132 associated with a left occupancy grid 231 and a right occupancy grid 233. As shown in the occupancy grids 231, 233 of FIG. 5, front voxels 234 are highlighted for each layer of each occupancy grid.

Figure 6:
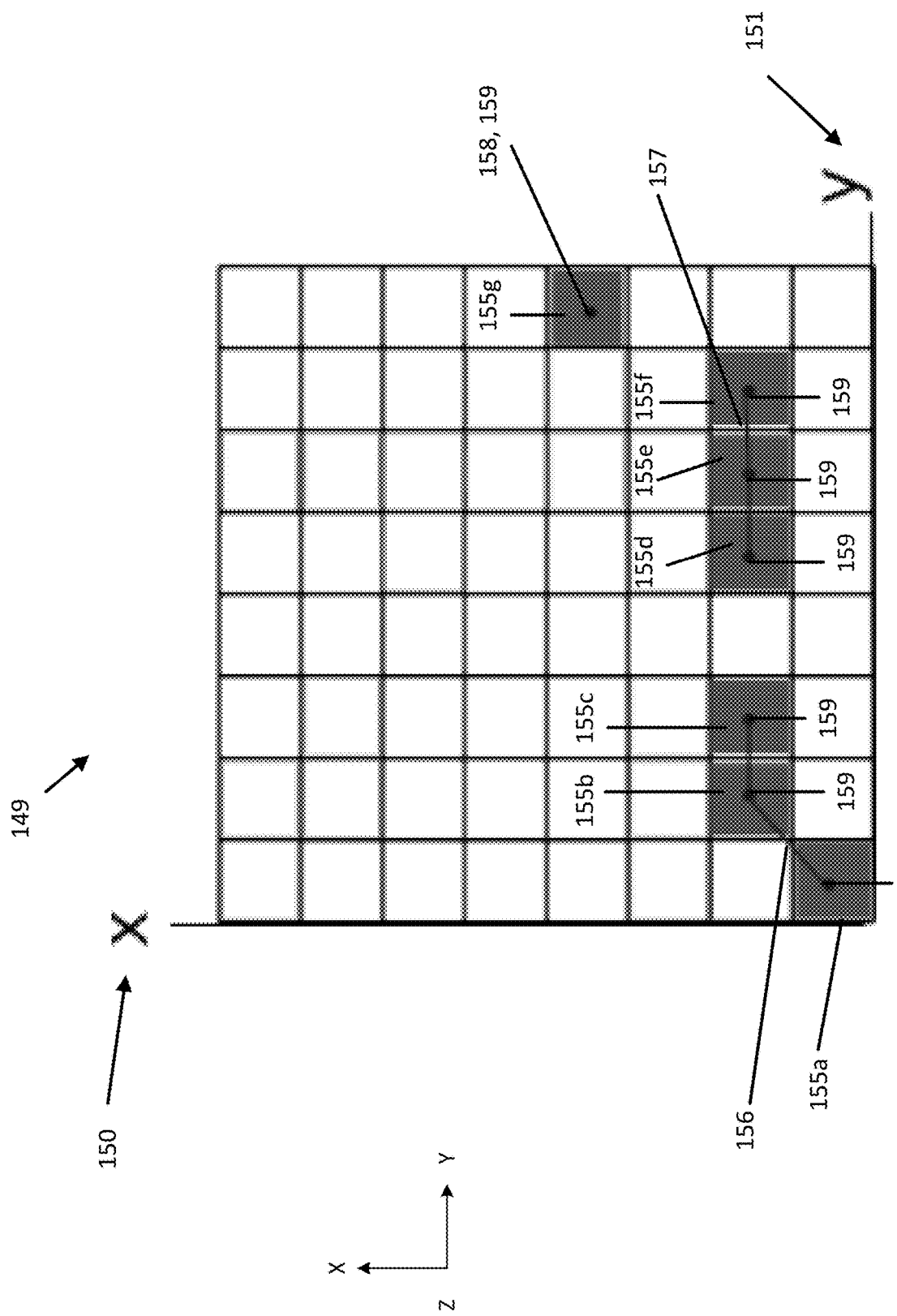
FIG. 6 illustrates an example set of object polylines for the single layer of the occupancy grid of FIG. 4.

FIG. 6 illustrates an example set of object polylines 156, 157, 158 for the single layer of the occupancy grid 149 of FIG. 4. As described above, the mobile device 122 and/or the server 125 generates object polylines for each layer of each identified voxel occupancy grid that has not been extracted. The mobile device 122 and/or the server 125 may generate object polylines 156, 157, 158 by connecting respective pre-defined points 159 of respective front voxels 155a-g within each layer. For each layer of grid voxels, the mobile device 122 and/or the server 125 identifies a pre-defined point 159 in each front voxel 155a-g in increasing order in a direction of travel along the roadway. In FIG. 6, the first direction 151 is the direction of travel along the roadway. A pre-defined point 159 may be the center point of each grid voxel. However, the pre-defined point 159 may be any point within a grid voxel. As shown in FIG. 6, object polyline 156 connects front voxels 155a-c, object polyline 157 connects front voxels 155d-f, and object polyline 158 contains only front voxel 155g.

The mobile device 122 and/or the server 125 connects the pre-defined points 159 of the front voxels 155a-g to form an object polyline when the pre-defined points 159 are adjacent to and within one voxel distance of each other. Object polylines are generated by processing the front voxels 155a-g for each row of voxels in increasing order along a direction, such as the direction of travel. For the purpose of this discussion, a row of voxels means a row of voxels extending in the second direction 150. Respective points 159 within each front voxel 155a-g are connected with a polyline according to a set of rules. For example, when analyzing a particular row of voxels, if the row of voxels immediately preceding the row of voxels being analyzed did not contain a front voxel, a new polyline begins at the next identified front voxel. Stated another way, if there was no front voxel at y-1, where y indicates a position along a y-axis (e.g., direction of travel/the first direction 151), a new object polyline is started. Another example rule is that if the difference between a current and previous voxel's x-indices (i.e., measurement in the second direction 150) is greater than one (1), a new object polyline is started. If neither of these rules apply, a voxel is joined to the object polyline of the preceding voxel, if any.

Referring to FIG. 6, starting with the first row of voxels including front voxel 155a, the mobile device 122 and/or the server 125 analyzes front voxel 155*a*. Applying the rules above, since there is not a front voxel in the row of voxels immediately preceding the row of voxels being analyzed (in this case, since there is no preceding row of voxels there cannot be a previous, adjacent front voxel), the mobile device 122 and/or the server 125 starts a new object polyline 156. The mobile device 122 and/or the server 125 next analyzes the second row of voxels in the direction of travel and applies the rules above to front voxel 155*b*. Since there is a front voxel 155*a* in the row preceding the second row, and since the difference in x-indices (i.e., measurement in the second direction 150) of front voxels 155*a* and 155*b* is equal to 1 and therefore not greater than 1, front voxel 155*b* is joined to the object polyline started by front voxel 155*a*. The mobile device 122 and/or the server 125 next analyzes the third row of voxels in the direction of travel and applies the rules above to the next front voxel 155*c*. Since there is a front voxel 155*b* in the row preceding the third row, and since the difference in x-indices of front voxels 155*b* and 155*c* is equal to zero (0) and therefore not greater than 1, front voxel 155*c* is joined to the object polyline started by front voxels 155*a* and 155*b*. The mobile device 122 and/or the server 125 next analyzes the fourth row of voxels in the direction of travel. Since there is no front voxel in the fourth row of voxels to analyze, the mobile device 122 and/or the server 125 next analyzes the fifth row of voxels in the direction of travel. Since there was no front voxel in the row preceding the fifth row, the preceding object polyline 156 ends and a new object polyline 157 is started. The mobile device 122 and/or the server 125 applies the same analysis described above to the remaining front voxels 155*e-g*. For front voxel 155*g*, since the difference in x-indices of front voxels 155*g* and 155*f* is equal to 2 and thus greater than 1, the preceding object polyline 157 ends and a new object polyline 158 is started.

Figure 7:
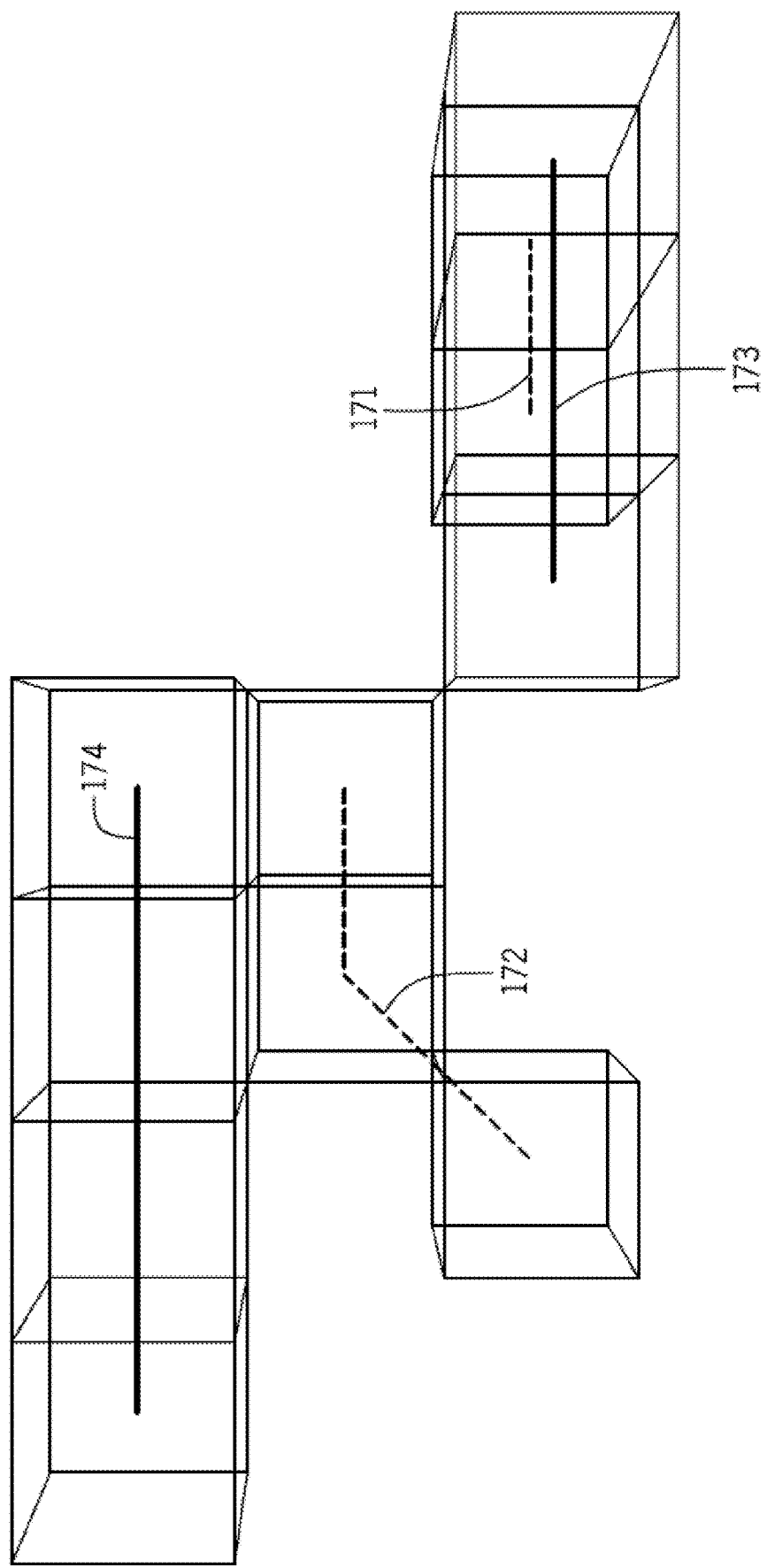
FIG. 7 illustrates an example set of object polylines for two vertical layers of an occupancy grid.

FIG. 7 illustrates an example set of object polylines for two vertical layers of an occupancy grid. The object polylines 171 and 172 represented in FIG. 7 as dashed lines are object polylines in a lower layer. The object polylines 173 and 174 represented in FIG. 7 as solid lines are object polylines in an upper layer. A number of roadside objects may be represented by an occupancy grid having multiple vertical layers of grid voxels. In some cases, those multiple vertical stacks of grid voxels may be very similar, since the geometry of the roadside object is essentially the same from top to bottom. Some examples include walls, trees, poles, lights or light posts, and signs. In these cases, generated object polylines for the different vertical layers of grid voxels for those objects would be very similar and redundant, since one of the duplicative object polylines can represent the roadside object as well as all of the duplicative object polylines. Discarding the redundant, or duplicative, object polylines reduces the amount of computing and networking resources required to communicate and store the object polylines.

The mobile device 122 and/or the server 125 may perform a vertical deduplication on adjacent vertical layers of grid voxels. To do so, the mobile device 122 and/or the server 125 may compare object polylines of adjacent vertical layers of grid voxels, where the adjacent vertical layers include an upper vertical layer and a lower vertical layer. The mobile device 122 and/or the server 125 may then measure the similarity between the object polylines in the adjacent vertical layers. The measured similarity measure may be stored in a database 123 and/or 133. The mobile device 122 and/or the server 125 may discard the object polylines in the upper vertical layer that are similar to the object polylines in the lower vertical layer based on a predetermined similarity criterion. An identification of the discarded object polylines may also be stored in a database 123 and/or 133.

The process of discarding similar object polylines assumes that all possible pairs of object polylines are compared in a greedy fashion (i.e. when it is determined that one object polyline meets the similarity threshold with respect to a second object polyline, one of the object polylines is discarded). Any number of similarity criteria may be used to determine whether two object polylines are similar. In one example, the mobile device 122 and/or the server 125 may project the object polylines being compared into an x-y plane. The mobile device 122 and/or the server 125 may select the object polyline with the smaller number of points. As discussed above, points of an object polyline may be the center point of a voxel or may be any pre-defined point of a voxel. If the object polylines being compared have the same number of points, the mobile device 122 and/or the server 125 may select either one. The mobile device 122 and/or the server 125 may then compute the distance between each point on the smaller object polyline to the closest point on the larger object polyline. This may be done without interpolation. The mobile device 122 and/or the server 125 may then compute the average distance and filter the results based on the result. An average distance of 0.2 meters, for example, may be used to determine the similarity between two object polylines.

Figure 8:
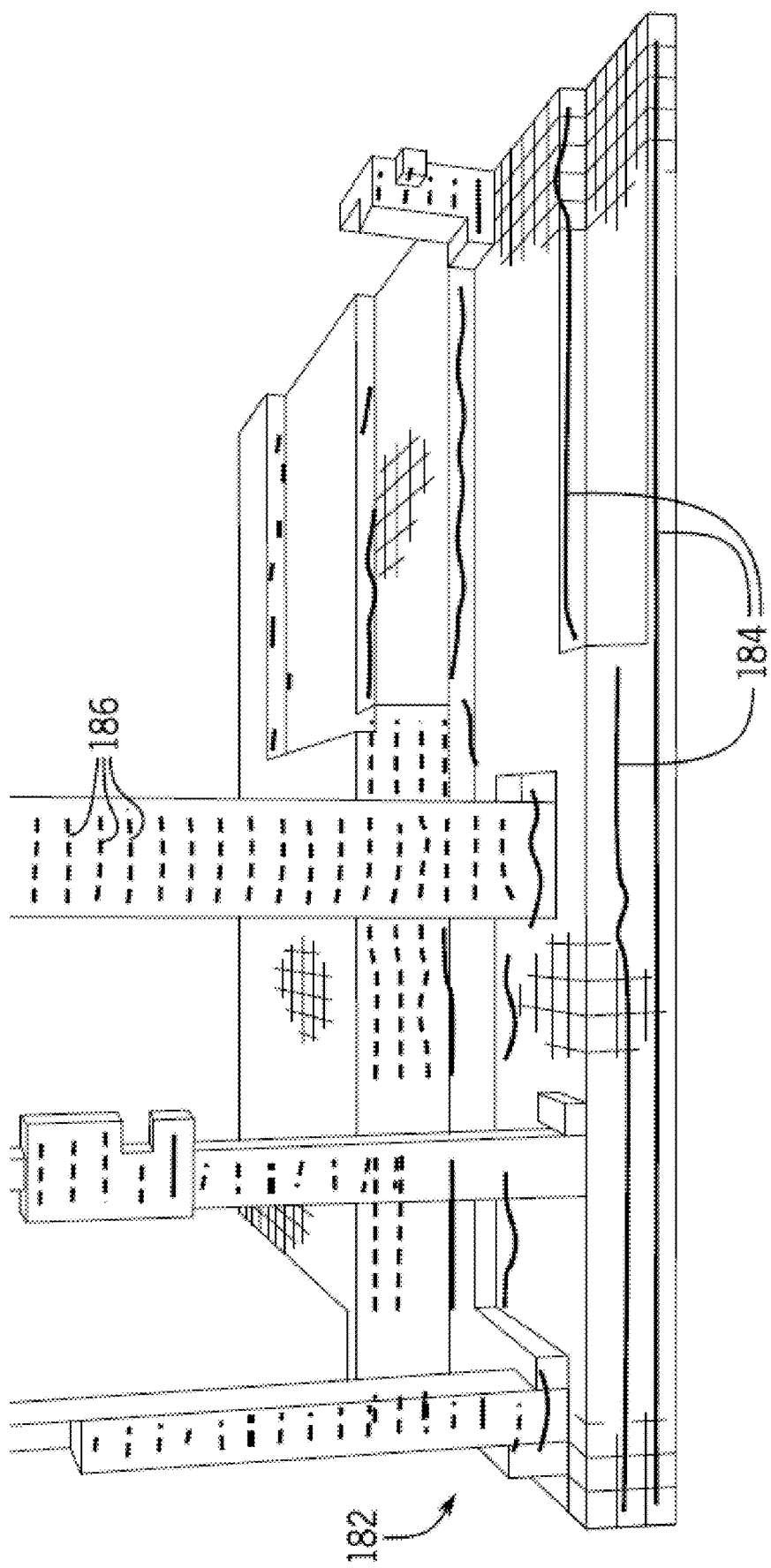
FIG. 8 illustrates an example set of filtered object polylines for an occupancy grid.

FIG. 8 illustrates an example set of filtered object polylines for an occupancy grid. The occupancy grid 182 of FIG. 8 may represent a series of objects along the side of a road at region of the roadway. The objects may include short objects (e.g., guardrails) as well as taller objects (e.g., utility poles). The mobile device 122 and/or the server 125 generates polylines for these objects according to the methods described above. The mobile device 122 and/or the server 125 may then perform vertical deduplication for similar object polylines of the same object as described above in reference to FIG. 7 and discard the duplicative object polylines. As shown in FIG. 8, similar object polylines 186 for the taller objects are discarded, while other object polylines 184 more useful for localization are retained. The similar object polylines 186 are discarded because they closely resemble the object polylines of the lower layers of the occupancy grid 182.

Figure 9:
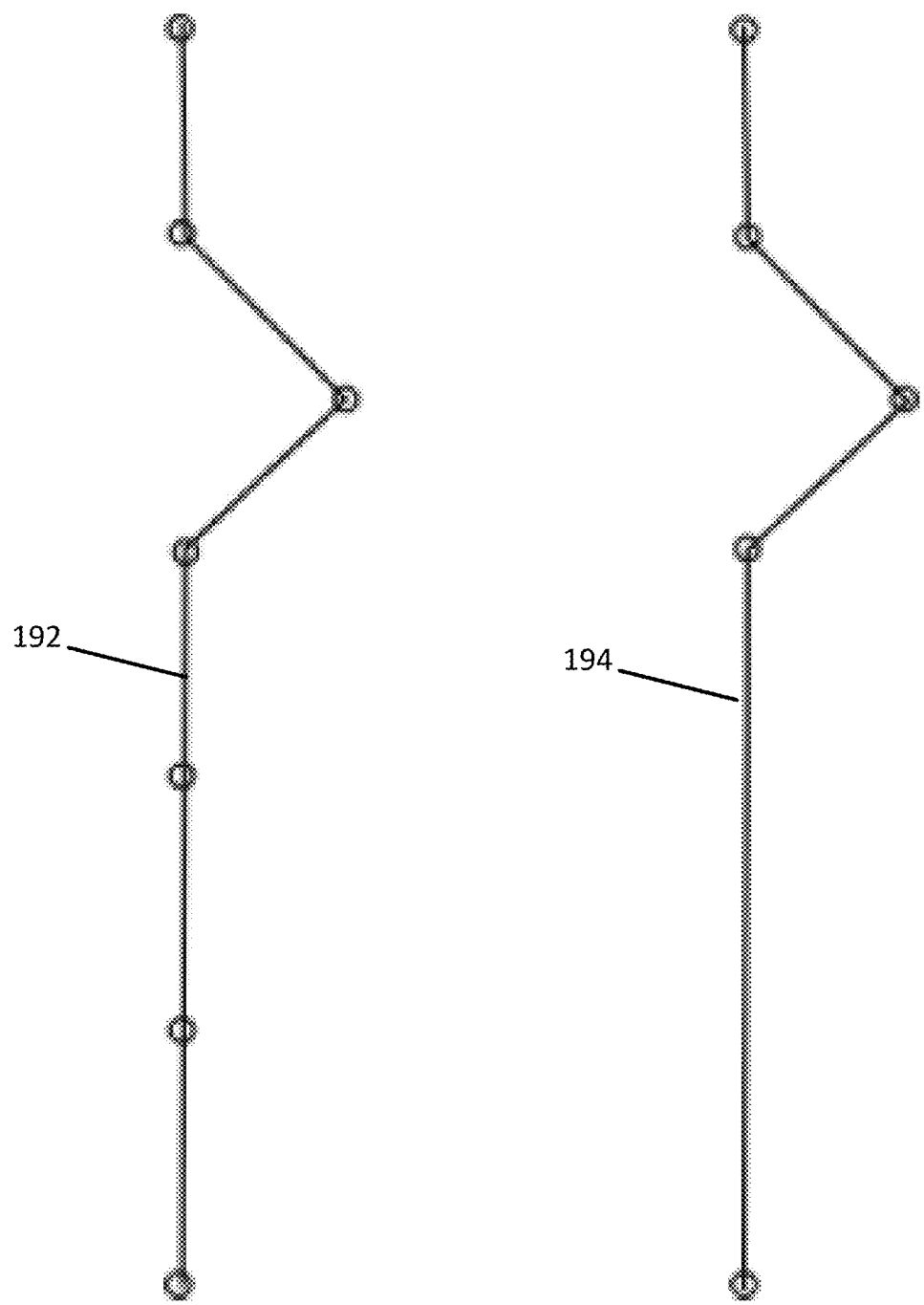
FIG. 9 illustrates an example object polyline before and after compression.

The mobile device 122 and/or the server 125 may compress object polylines to reduce the amount of computing and networking resources required to communicate and store the object polylines. The mobile device 122 and/or the server 125 may compress object polylines by removing points of the object polylines that do not change the shape of the object polyline. An example of points that do not change the shape of the object polyline include points having the same coordinates in the second direction (i.e., direction lateral to the roadway). In these cases, where the object polyline is essentially a straight line, there is no need for multiple data points, or samples, along the straight portion of the polyline. Start and end points would suffice. FIG. 9 illustrates an example object polyline before and after compression. The object polyline 192 is compressed by removing points of the straight portion of the object polyline 192. The compressed, or simplified, object polyline 194 thus requires less storage and bandwidth requirements.

As discussed above, the mobile device 122 and/or the server 125 may provide the compressed object polylines to content providers, such as a map developer 121 or an applications developer, to include the object polylines in detailed maps of locations or applications, such as mobile applications, using location related information. The object polylines may also be provided to end users, such as other mobile devices 122 or vehicles 124, in order to perform localization techniques. The object polylines may be provided to other various services or providers as well, such as navigational services or traffic server providers.

Figure 10:
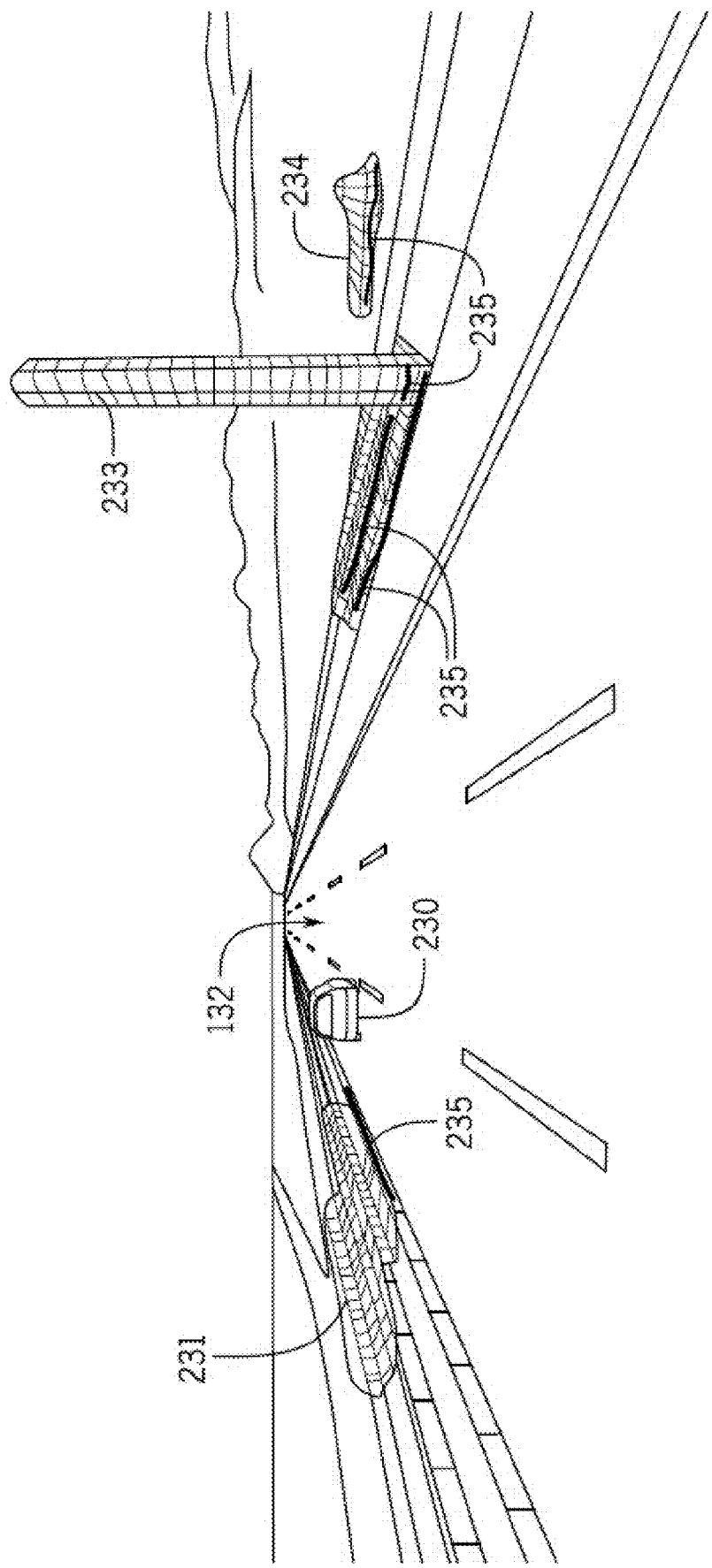
FIG. 10 illustrates an example localization application for the occupancy grids using object polylines.

FIG. 10 illustrates an example localization application for the occupancy grids using object polylines. FIG. 10 illustrates example occupancy grids 231, 233, 234 at a region of a roadway 132. The roadway 132 is associated with occupancy grids at specific locations. In one example, a set of occupancy grids is stored for each predetermined section of road, or chunk, of the roadway 132. For example, the vehicle 230 of FIG. 10 is traveling at a particular location of the roadway 132 associated with a left occupancy grid 231 and a two right occupancy grids 233 and 234. As shown in the occupancy grids 231, 233, 234 of FIG. 10, object polylines 235 are shown for the bottom most layer or layers of each occupancy grid 231, 233, 234. In one example, object polylines are not displayed for the majority of vertical layers of grid voxels for the tall object in occupancy grid 233. The mobile device 122 and/or the server 125 performed vertical deduplication for similar object polylines of the tall object in occupancy grid 233 as described above in reference to FIG. 7 and discarded the duplicative object polylines. The similar object polylines are discarded because they closely resemble the object polylines of the lower layers of the occupancy grid 233. In another example, occupancy grids smaller than occupancy grid 234 that represent smaller objects such as shrubs or hydrants are filtered out by the mobile device 122 and/or the server 125 according to the methods described above.

In a localization technique, as a vehicle 230 travels down roadway 132, data is collected along the roadway 132 and compared to the object polylines 235 of the left occupancy grid 231 and right occupancy grids 233, 234. The collected data may be range data (e.g., LiDAR) or image data (e.g., camera). A comparison of the collected data and the object polylines 235 of the left occupancy grid 231 and right occupancy grids 233, 234 determines the location of the vehicle 230. In one example, the vehicle 230 is matched with the predetermined section of road. In another example, the vehicle 230 is matched with a relative location along the predetermined section of road.

Figure 11:
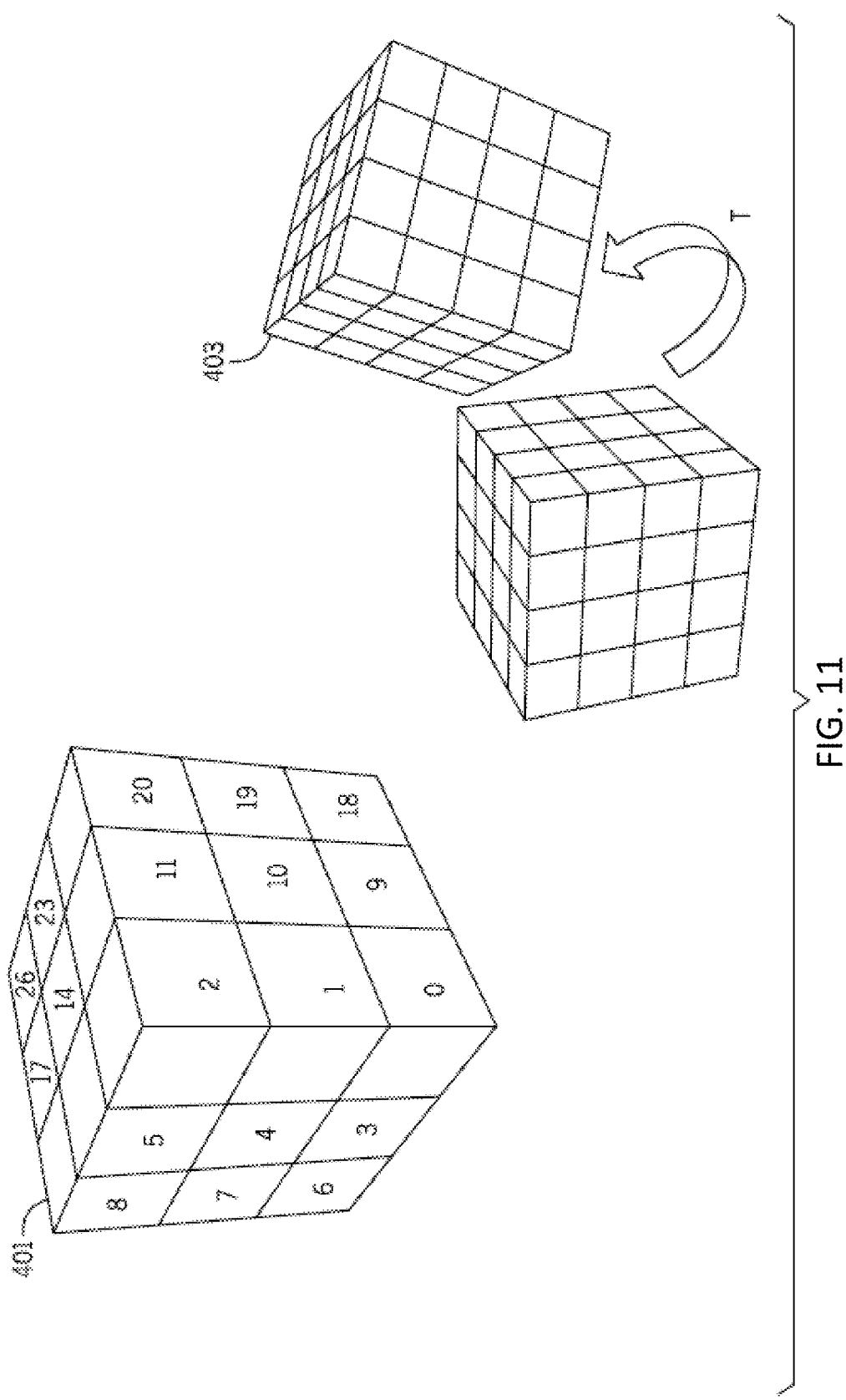
FIG. 11 illustrates an example voxel occupancy array.

FIG. 11 illustrates an example voxel occupancy array 401 and voxel transformation 403. The voxel occupancy array 401 may be cubical, a rectangular prism, or another shape. The voxel occupancy array 401 may include voxels that are numbered or ordered in a sequence across the shape. For example, FIG. 11 illustrates a numbering sequence from 0 to 26. The numbering begins in the front bottom, extends in a first direction from 0 to 2 in the sequence, then completes a plane in a second direction up to 8 in the sequence, and finally repeats the plane up to 26 in the sequence to form the voxel occupancy array 401. The occupancy array 401 is a canonical position according to the ordered sequence with the lower, left, rear point at the origin and voxels in extending into the first octant of a 3D Cartesian space.

The canonical grid is positioned in the x-direction, y-direction, and z-direction are unambiguous and aligned as the three sides or axes of the occupancy array 401. The axes of the occupancy array 401 are dependent on the axis of the collection device. The canonical grid may be positioned in the world (e.g., axes of the Earth) by providing a transformation to occupancy array 401. The transformation may be performed with a transformation matrix, a quaternion, or another matrix multiplication.

The axis of the collection device may be converted through reference coordinates (e.g., latitude, longitude, and altitude) to local tangent plane (LTP) coordinates. The LTP coordinates may include axes that are based on the World Geodetic System 1984 (WGS84). The WGS84 is an Earth fixed terrestrial reference system based on the size and shape of the Earth and the direction of gravity. The Z-axis is a direction up and perpendicular to the surface of the Earth or the roadway, which is a normal to the WGS84 ellipsoid. The Y-axis points north. The X-axis is perpendicular to the Z-axis and Y-axis (e.g., in the direction of east). The plane for Z=-altitude is tangent to the WGS84 ellipsoid.

When the transformation is performed with a transformation matrix 403, which may be referred to as a voxel grid transformation matrix. The transformation matrix 403 may have n+1 by n+1 values when the occupancy array 401 has n by n voxels. The transformation matrix 403 includes a rotation matrix followed by a translation vector. An example transformation matrix 403 may be converted or vectorized into an order such that elements of the rows of the matrix are placed into a vector (e.g., the first row of the matrix is concatenated with the second row of the matrix and so on). An example of such vectorization or reshaping may convert a 4×4 matrix into a 1×16 vector. An example of the order includes T(0,0) T(0,1) T(0,2) T(0,3) T(1,0) T(1,1) T(1,2) T(1,3) T(2,0) T(2,1) T(2,2) T(2,3) T(3,0) T(3,1) T(3,2) T(3,3). The transformation matrix T with elements T (row, col) converts points in the canonical voxel grid or occupancy array 401 in LTP coordinates to a general position in LTP coordinates.

When the transformation is performed with a quaternion, as an alternative to transformation matrix 403, the matrix is performed through rotations in three dimensions that are described as a sequence of rotations in a coordinate system. Each rotation is about an axis defined by a unit vector. The three vector components and the angle of rotation may be stored as a quaternion with four components. The quaternion technique may be used to eliminate ambiguities and precision issues (e.g., Gimble lock) in other types of 3D transformations.

An example pseudo code for encoding an occupancy grid may include:

ReferenceLatitude ReferenceLongitude ReferenceAltitude

VoxelSize

LengthX LengthY LengthZ

T(0,0) T(0,1) T(0,2) T(0,3) T(1,0) T(1,1) T(1,2) T(1,3) T(2,0) T(2,1) T(2,2) T(2,3) T(3,0) T(3,1) T(3,2) T(3,3)

OccupancyArray

Figure 12:
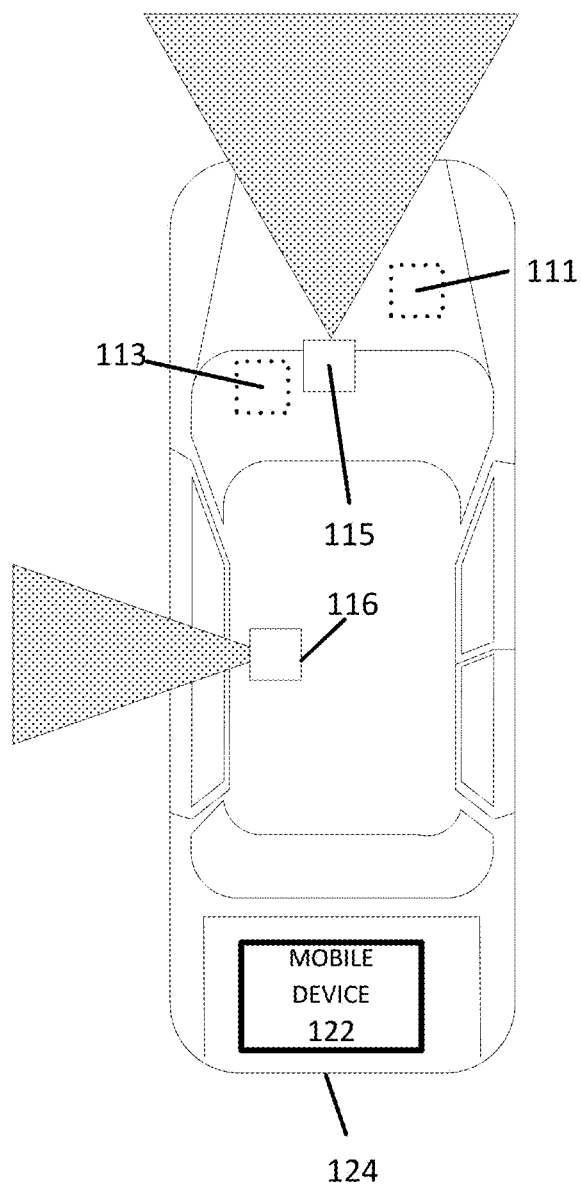
FIG. 12 illustrates an exemplary vehicle of the system of FIG. 1.

FIG. 12 illustrates an exemplary vehicle of the system of FIG. 1. FIG. 12 illustrates an example vehicle 124 for collecting data for the occupancy grids and/or for performing localization using the generated object polylines and subsequently collected distance data. A connected vehicle includes a communication device and an environment sensor array for reporting the surroundings of the vehicle 124 to the server 125. The connected vehicle may include an integrated communication device coupled with an in-dash navigation system. The connected vehicle may include an ad-hoc communication device such as a mobile device 122 or smartphone in communication with a vehicle system. The communication device connects the vehicle to a network including at least one other vehicle and at least one server. The network may be the Internet or connected to the internet.

The sensor array may include one or more sensors configured to detect surroundings of the vehicle 124. The sensor array may include multiple sensors. Example sensors include an optical distance system such as LiDAR 116, an image capture system 115 such as a camera, a sound distance system such as sound navigation and ranging (SONAR), a radio distancing system such as radio detection and ranging (RADAR) or another sensor. The camera may be a visible spectrum camera, an infrared camera, an ultraviolet camera or another camera.

The vehicles 124 may include a global positioning system, a dead reckoning-type system, cellular location system, or combinations of these or other systems, which may be referred to as position circuitry or a position detector. The positioning circuitry may include suitable sensing devices that measure the traveling distance, speed, direction, and so on, of the vehicle 124. The positioning system may also include a receiver and correlation chip to obtain a GPS signal. Alternatively or additionally, the one or more detectors or sensors may include an accelerometer built or embedded into or within the interior of the vehicle 124.

In some alternatives, additional sensors may be included in the vehicle 124. An engine sensor 111 may include a throttle sensor that measures a position of a throttle of the engine or a position of an accelerator pedal, a brake senor that measures a position of a braking mechanism or a brake pedal, or a speed sensor that measures a speed of the engine or a speed of the vehicle wheels. Another additional example, vehicle sensor 113, may include a steering wheel angle sensor, a speedometer sensor, or a tachometer sensor.

A mobile device 122 may be integrated in the vehicle 124, which may include assisted driving vehicles such as autonomous vehicles, highly assisted driving (HAD), and advanced driving assistance systems (ADAS). Any of these assisted driving systems may be incorporated into mobile device 122. Alternatively, an assisted driving device may be included in the vehicle 124. The assisted driving device may include memory, a processor, and systems to communicate with the mobile device 122. The assisted driving vehicles may respond to geographic data received from geographic database 123 and the server 125, which may have been updated according to the collection of data in the embodiments described herein. The assisted driving vehicle may select a route based on any of the examples herein, including in response to current location based on a comparison of the local sensor data to object polylines for a signature of the location.

The term autonomous vehicle may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes. The autonomous vehicle may steer, brake, or accelerate the vehicle based on the position of the vehicle in order to pass the initial observation location or road object in response to the request for additional observations.

A highly assisted driving (HAD) vehicle may refer to a vehicle that does not completely replace the human operator. Instead, in a highly assisted driving mode, the vehicle may perform some driving functions and the human operator may perform some driving functions. Vehicles may also be driven in a manual mode in which the human operator exercises a degree of control over the movement of the vehicle. The vehicles may also include a completely driverless mode. Other levels of automation are possible. The HAD vehicle may control the vehicle through steering or braking in response to the on the position of the vehicle and the request for additional observations for the road object.

Similarly, ADAS vehicles include one or more partially automated systems in which the vehicle alerts the driver. The features are designed to avoid collisions automatically. Features may include adaptive cruise control, automate braking, or steering adjustments to keep the driver in the correct lane. ADAS vehicles may issue warnings for the driver based on the position of the vehicle.

In a localization technique, as a vehicle 124 travels down a region of a roadway, an onboard processor accesses object polylines associated with the region of the roadway. The onboard processor receives sensor data from the vehicle sensor array, including the optical distance system such as LiDAR 116 and the image capture system 115 such as a camera, from the region of the roadway and compares the sensor data with the object polylines. The vehicle 124 performs localization based on the comparison of the sensor data with the object polylines.

Figure 13:
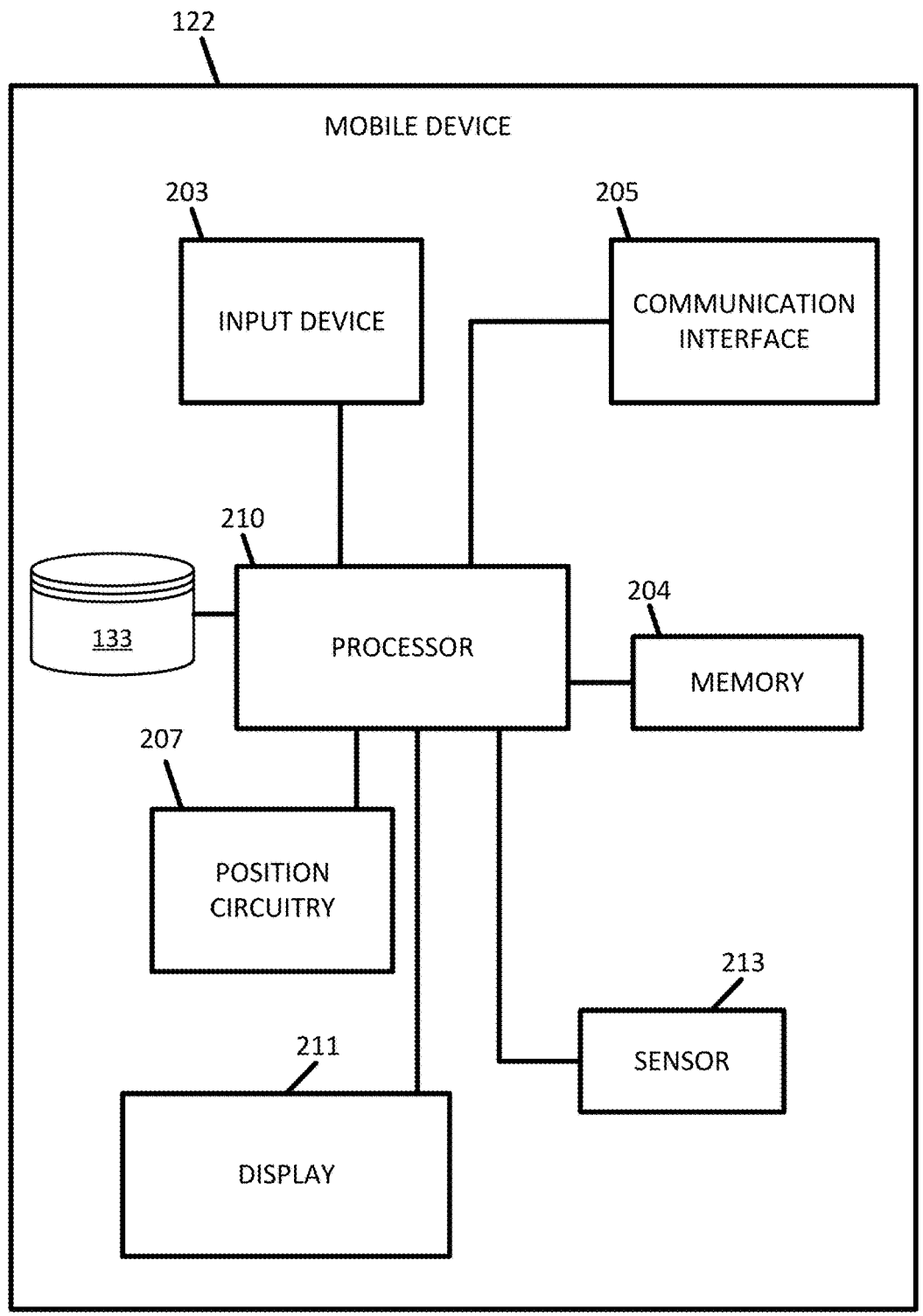
FIG. 13 illustrates an example mobile device.

FIG. 13 illustrates an exemplary mobile device 122 of the system of FIG. 1. The mobile device 122 includes a processor 210, a vehicle database 133, a memory 204, an input device 203, a communication interface 205, position circuitry 207, a display 211, a sensor 213. The input device 203 may receive settings to enable or disable the mobile device for collecting observations. Additional, different, or fewer components are possible for the mobile device 122.

Figure 14:
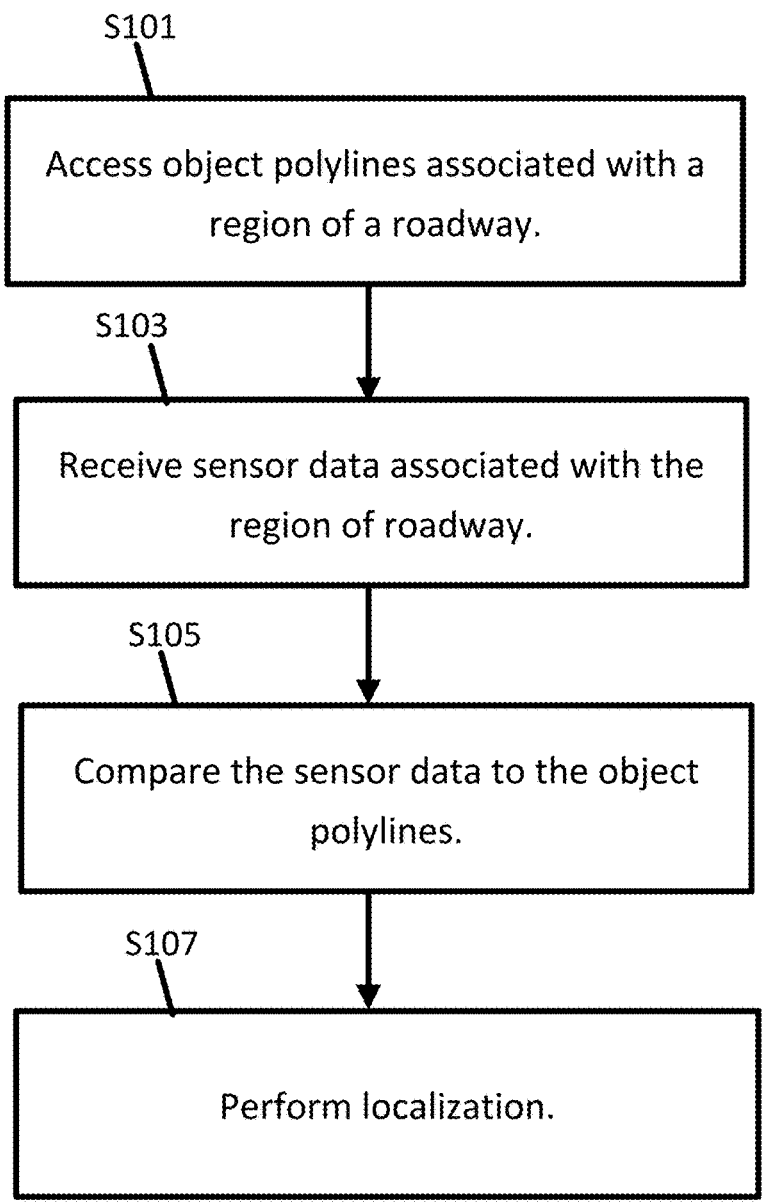
FIG. 14 illustrates an example flowchart for the mobile device of FIG. 13.

FIG. 14 illustrates an example flowchart for the mobile device of FIG. 13. Additional, different, or fewer steps may be included.

At act S101, the processor 210 accesses object polylines stored in the database 133 or memory 204 that are associated with a region of a roadway corresponding to the position of the mobile device 122. The object polylines may have been generated by the server as an efficient description of objects that correspond to the location data and as a signature of the surrounding of the location data. The position circuitry 207 or the processor 210 detects a geographic position of the mobile device 122 or the vehicle and may send the geographic location for the mobile device 122 to a server. The position circuitry 207 is one example means for detecting or determining a geographic position. The processor 210 also includes circuity serving as means for detecting or determining a geographic position. The detected geographic position of the mobile device 122 may include a latitude and longitude pair. The geographic position may be detected or sampled at periodic intervals in time or distance, or may be continuously detected. The sensor 213, which may include distancing sensors, range sensor, image sensors, or another sensor as described with respect to FIG. 12 may also provide information for determining the geographic position of the mobile device 122.

At act S103, the processor 210 or the communication interface 205 receives sensor data associated with the region of the roadway. The communication interface 205 is an example for a means for receiving the sensor data. The processor 210 may include circuitry or a module or an application specific controller as a means for receiving the sensor data. The processor 210 or the communication interface 205 may receive sensor data from the vehicle sensor array, including the optical distance system such as LiDAR 116 and the image capture system 115 such as a camera. The processor 210 or the communication interface 205 may receive sensor data from the sensor 213, which may include distancing sensors, range sensor, image sensors, or another sensor as described with respect to FIG. 12.

At act S105, the processor 210 compares the sensor data received in act S103 with the object polylines accessed in act S101. The processor 210 compares a value, or values, of each object polyline to the corresponding sensor data. The values of the object polylines may be a signature vector or may be values for each point of the object polyline, and the sensor data may be arranged in a similar vector. The processor 210 compares the signature vector to the sensor data vector to calculate a number of matching points of the object polyline. The processor 210 may include circuitry or a module or an application specific controller as a means for comparing the sensor data to the object polylines.

At act S107, the processor 210 calculates or determines a location for the mobile device based on the comparison of act S105. The processor 210 may include circuitry or a module or an application specific controller as a means for determining the location of the mobile device 122 based on the object polyline comparison. The processor 210 may determine a number of matching points of an object polyline based on the comparison of the signature vector to the vicinity data vector. When a certain number of points match, the processor 210 determines that the current location of the mobile device 122, or a location when the vicinity data was detected, corresponds to the object polylines. The match may be determined when a predetermined quantity of points match the vicinity data. The match may be determined when a predetermined percentage of the points (e.g., 50%, 90%, or 99%) match the vicinity data. The position circuitry 207 may have determined an estimate of the geographic position, and the comparison of act S105 and the calculation of act S107 provides a refinement or otherwise improves on the accuracy of the estimate of the geographic position. Alternatively, the position circuitry 207 may be omitted and only the acts of S105 and S107 determine the geographic position.

Acts S101 through S107 may be performed automatically by the mobile device 122. For example, acts S101 through S107 may initiate whenever the geographic position of the mobile device 122 is detected or sampled. This may happen at periodic intervals in time or distance, or may be continuous as the mobile device 122 moves from location to location.

The processor 210 may include a routing module including an application specific module or processor that calculates routing between an origin and destination. The routing module is an example means for generating a routing command based on the current location of the mobile device 122 from the object polyline comparison. The routing command may be a route from the route to the destination. The routing command may be a driving instruction (e.g., turn left, go straight), which may be presented to a driver or passenger, or sent to an assisted driving system. The display 211 is an example means for displaying the routing command. The routing command may be derived from a road network or map data stored in database 133. The database 133 is an example means for storing map data including a road network.

The mobile device 122 may generate a routing instruction based on the vehicle database 133. The routing instructions may be provided by display 211. The mobile device 122 may be configured to execute routing algorithms to determine an optimum route to travel along a road network from an origin location to a destination location in a geographic region. Using input(s) including map matching values from the server 125, a mobile device 122 examines potential routes between the origin location and the destination location to determine the optimum route. The mobile device 122, which may be referred to as a navigation device, may then provide the end user with information about the optimum route in the form of guidance that identifies the maneuvers required to be taken by the end user to travel from the origin to the destination location. Some mobile devices 122 show detailed maps on displays outlining the route, the types of maneuvers to be taken at various locations along the route, locations of certain types of features, and so on. Possible routes may be calculated based on a Dijkstra method, an A-star algorithm or search, and/or other route exploration or calculation algorithms that may be modified to take into consideration assigned cost values of the underlying road segments.

The mobile device 122 may plan a route through a road system, or modify a current route through a road system in response to the request for additional observations of the road object. For example, when the mobile device 122 determines that there are two or more alternatives for the optimum route and one of the routes passes the initial observation point, the mobile device 122 selects the alternative that passes the initial observation point. The mobile devices 122 may compare the optimal route to the closest route that passes the initial observation point. In response, the mobile device 122 may modify the optimal route to pass the initial observation point.

Figure 15:
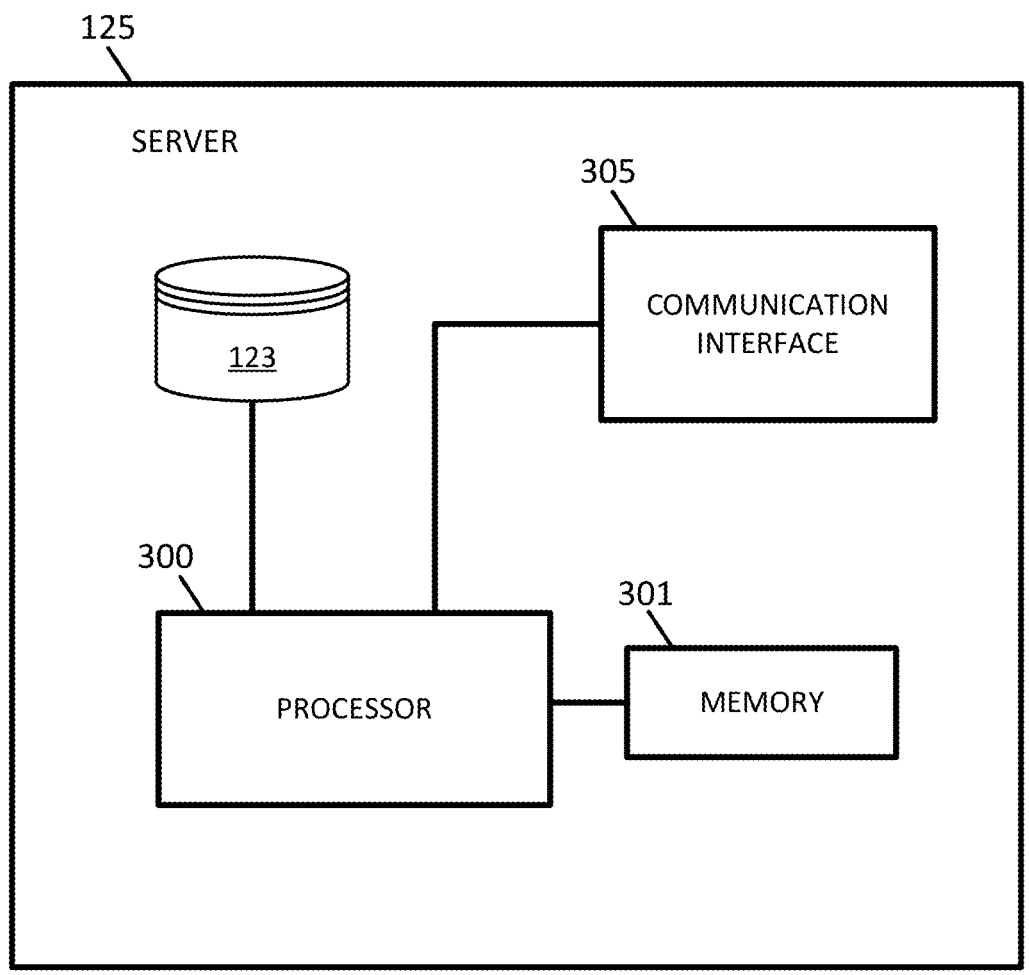
FIG. 15 illustrates an example server.

FIG. 15 illustrates an example server 125, which may apply to the system of FIG. 1. The server 125 includes a processor 300, a communication interface 305, a memory 301, and a database 123. An input device (e.g., keyboard or personal computer) may be used to enter settings to the server 125. Additional, different, or fewer components may be provided in the server 125.

Figure 16:
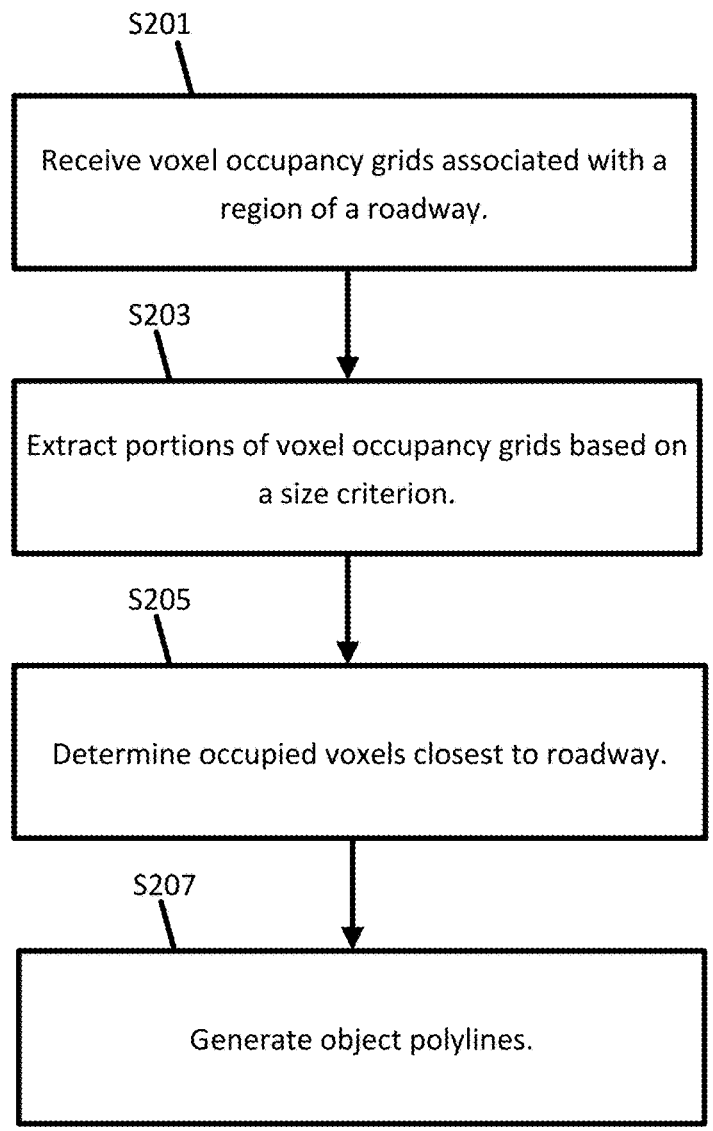
FIG. 16 illustrates an example flowchart for the server of FIG. 15.

FIG. 16 illustrates an example flowchart for the operation of server 125 in detecting roadside objects. Additional, different, or fewer acts may be provided.

At act S201, the processor 300 or communication interface 305 receives one or more voxel occupancy grids associated with a region of a roadway. The voxel occupancy grids may be generated by the mobile device 122 or the vehicle 124. The communication interface 305 may be means for receiving one or more voxel occupancy grids. The processor 300 may include circuitry or a module or an application specific controller as a means for receiving the one or more voxel occupancy grids. The one or more voxel occupancy grids may be divided into longitudinal sections along the length of the roadway. The one or more voxel occupancy grids may be analyzed in these sections such that each occupancy grid corresponds to one of the longitudinal sections.

At act S203, the processor 300 extracts portions of the one or more voxel occupancy grids based on a size criterion. The processor 300 may include circuitry or a module or an application specific controller as a means for filtering or extracting portions of the voxel occupancy grids based on a size criterion. In some examples, the voxel occupancy grids may be reduced to exclude any voxel occupancy grid having less than a predetermined number of voxels (e.g., less than 20 voxels). The voxel occupancy grids may also be filtered to exclude any grid voxels of the voxel occupancy grids based on a height of each of the voxel occupancy grids above a road surface at the region of the roadway. The processor 300 may extract grid voxels of each of the voxel occupancy grids having a height that does not fall within a predetermined height range above the road surface at the region of the roadway (e.g., 30 cm to 150 cm above the roadway). The predetermined height range may be defined according to an upper height range limit and a lower height range limit such that the voxel occupancy grids are filtered to remove data between the upper and lower height range limits. The voxel occupancy grids may also be filtered to remove data that is more than a threshold distance from the point of collection.

At act S205, the processor 300 determines occupied voxels closest to the roadway in each vertical layer of the one or more vertical layers of grid voxels of the portions of the voxel occupancy grids that were not extracted in act S203. The processor 300 may include circuitry or a module or an application specific controller as a means for determining occupied voxels closest to the roadway. The processor 300 may determine whether each grid voxel of a voxel occupancy grid of the one or more voxel occupancy grids is occupied or unoccupied. The processor 300 may then measure the distance from each occupied grid voxel to a nearest edge of the roadway. The processor 300 defines, for each row and layer of grid voxels, a determined occupied voxel with a minimum measured distance as an occupied voxel closest to the roadway.

At act S207, the processor 300 generates, for each vertical layer of grid voxels of the portions of the voxel occupancy grids not extracted in act S203, object polylines that represent roadside objects at the region of the roadway. The processor 300 may include circuitry or a module or an application specific controller as a means for generating the object polylines. The processor 300 may generate the object polylines by connecting respective pre-defined points of respective occupied voxels closest to the roadway determined in act S205 for each vertical layer of grid voxels of the portions of the voxel occupancy grids not extracted in act S203. The processor 300 may connect the pre-defined points within the same vertical layer when the pre-defined points are adjacent to and within one voxel distance of each other.

The memory 301 may be configured to store the object polylines for the grids arranged in an order that spans multiple dimensions of the grid. That is, a vector or an array may be defined that spans each dimension of the grid that is stored by the memory 301. Thus, memory 301 is a means for storing the object polylines in a particular order dependent on the dimensions of the grid.

The communication interface 305 may send the object polylines to the mobile device 122 or vehicle 124 in response to receiving location data from the mobile device 122. The processor 300 may query the geographic database 123 with the location data to select the localization geometry, which may include an object polyline.

The mobile device 122 may be a personal navigation device ("PND"), a portable navigation device, a mobile phone, a personal digital assistant ("PDA"), a watch, a tablet computer, a notebook computer, and/or any other known or later developed mobile device or personal computer. The mobile device 122 may also be an automobile head unit, infotainment system, and/or any other known or later developed automotive navigation system. Non-limiting embodiments of navigation devices may also include relational database service devices, mobile phone devices, car navigation devices, and navigation devices used for air or water travel.

Communication between the mobile device 122 and the server 125 through the network 127 may use a variety of types of wireless networks. Example wireless networks include cellular networks, the family of protocols known as WiFi or IEEE 802.11, the family of protocols known as Bluetooth, or another protocol. The cellular technologies may be analog advanced mobile phone system (AMPS), the global system for mobile communication (GSM), third generation partnership project (3GPP), code division multiple access (CDMA), personal handy-phone system (PHS), and 4G or long term evolution (LTE) standards, or another protocol.

The controller 210 and/or processor 300 may include a general processor, digital signal processor, an application specific integrated circuit (ASIC), field programmable gate array (FPGA), analog circuit, digital circuit, combinations thereof, or other now known or later developed processor. The controller 210 and/or processor 800 may be a single device or combinations of devices, such as associated with a network, distributed processing, or cloud computing.

The memory 204 and/or memory 301 may be a volatile memory or a non-volatile memory. The memory 204 and/or memory 301 may include one or more of a read only memory (ROM), random access memory (RAM), a flash memory, an electronic erasable program read only memory (EEPROM), or other type of memory. The memory 204 and/or memory 801 may be removable from the mobile device 122, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

The databases 123 and 133 may include geographic data used for traffic and/or navigation-related applications. The geographic data may include data representing a road network or system including road segment data and node data. The road segment data represent roads, and the node data represent the ends or intersections of the roads. The road segment data and the node data indicate the location of the roads and intersections as well as various attributes of the roads and intersections. Other formats than road segments and nodes may be used for the geographic data. The geographic data may include structured cartographic data or pedestrian routes.

The geographic database 123 may contain at least one road segment database record (also referred to as "entity" or "entry") for each road segment in a particular geographic region. The geographic database 123 may also include a node database record (or "entity" or "entry") for each node in a particular geographic region. The terms "nodes" and "segments" represent only one terminology for describing these physical geographic features, and other terminology for describing these features is intended to be encompassed within the scope of these concepts. The geographic database 123 may also include object polyline, or roadside object, data for specific locations in a particular geographic region. The object polyline data may include current roadside object data. The roadside object data may include the presence of roadside objects at a particular location of a roadway, as well as the types of roadside objects at that location.

The databases may also include other attributes of or about the roads such as, for example, geographic coordinates, physical geographic features (e.g., lakes, rivers, railroads, municipalities, etc.), street names, address ranges, speed limits, turn restrictions at intersections, and/or other navigation related attributes (e.g., one or more of the road segments is part of a highway or toll way, the location of stop signs and/or stoplights along the road segments), as well as points of interest (POIs), such as gasoline stations, hotels, restaurants, museums, stadiums, offices, automobile dealerships, auto repair shops, buildings, stores, parks, etc. The databases may also contain one or more node data record(s) which may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data may additionally or alternatively include other data records such as, for example, POI data records, topographical data records, cartographic data records, routing data, and maneuver data.

The geographic database 123 may include other kinds of data. The other kinds of data may represent other kinds of geographic features or anything else. The other kinds of data may include point of interest (POI) data. For example, the POI data may include POI records comprising a type (e.g., the type of POI, such as restaurant, hotel, city hall, police station, historical marker, ATM, golf course, etc.), location of the POI, a phone number, hours of operation, etc. The other data may also include 3D map data and 3D feature data associated with a location. The data may also include vehicle data associated with the road segment data. For example, the vehicle data may include vehicle locations, vehicle altitudes, and vehicle paths and routes associated with particular road segments contained in the road segment data records.

The geographic database 123 also includes indexes. The indexes may include various types of indexes that relate the different types of data to each other or that relate to other aspects of the data contained in the geographic database 123. For example, the indexes may relate the nodes in the node data records with the end points of a road segment in the road segment data records. As another example, the indexes may relate object polyline, or roadside object, data with a road segment in the segment data records or a geographic coordinate. An index may, for example, store data relating to one or more locations and related roadside object data for each location.

The databases may include historical roadside object data for one or more road segments. The databases may also include roadside attributes for one or more road segments. A roadside attribute may indicate that a road segment has a high probability of having a roadside object.

The geographic database 123 may be maintained by a content provider (e.g., a map developer). By way of example, the map developer may collect geographic data to generate and enhance the geographic database 123. The map developer may obtain data from sources, such as businesses, municipalities, or respective geographic authorities. In addition, the map developer may employ field personnel to travel throughout a geographic region to observe features and/or record information about the roadway. Remote sensing, such as aerial or satellite photography, may be used. The database 123 is connected to the server 125.

The geographic database 123 and the data stored within the geographic database 123 may be licensed or delivered on-demand. Other navigational services or traffic server providers may access the object polyline data, or roadside object data, and/or the vehicle data stored in the geographic database 123. Data including the roadside object data or vehicle data may be broadcast as a service.

The database 123 may be master geographic databases stored in a format that facilitates updating, maintenance, and development. For example, a master geographic database or data in the master geographic database is in an Oracle spatial format or other spatial format, such as for development or production purposes. The Oracle spatial format or development/production database may be compiled into a delivery format such as a geographic data file (GDF) format. The data in the production and/or delivery formats may be compiled or further compiled to form geographic database products or databases that may be used in end user navigation devices or systems.

For example, geographic data is compiled (such as into a physical storage format (PSF) format) to organize and/or configure the data for performing navigation-related functions and/or services, such as route calculation, turn by turn navigation instructions, route guidance, map display, speed calculation, distance and travel time functions, and other functions, by a navigation device. The navigation-related functions may correspond to vehicle navigation, pedestrian navigation, or other types of navigation. The compilation to produce the end user databases may be performed by a party or entity separate from the map developer. For example, a customer of the map developer, such as a navigation device developer or other end user device developer, may perform compilation on a received geographic database in a delivery format to produce one or more compiled navigation databases.

The input device 203 may be one or more buttons, keypad, keyboard, mouse, stylus pen, trackball, rocker switch, touch pad, voice recognition circuit, or other device or component for inputting data to the mobile device 122. The input device 203 and display 211 may be combined as a touch screen, which may be capacitive or resistive. The display 211 may be a liquid crystal display (LCD) panel, light emitting diode (LED) screen, thin film transistor screen, or another type of display. The output interface of the display 211 may also include audio capabilities, or speakers. In an embodiment, the input device 203 may involve a device having velocity detecting abilities.

The positioning circuitry 207 may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer and/or a magnetic sensor built or embedded into or within the interior of the mobile device 122. The accelerometer is operable to detect, recognize, or measure the rate of change of translational and/or rotational movement of the mobile device 122. The magnetic sensor, or a compass, is configured to generate data indicative of a heading of the mobile device 122. Data from the accelerometer and the magnetic sensor may indicate orientation of the mobile device 122. The mobile device 122 receives location data from the positioning system. The location data indicates the location of the mobile device 122.

The positioning circuitry 207 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 207 may include suitable sensing devices that measure the traveling distance, speed, direction, and so on, of the mobile device 122. The positioning system may also include a receiver and correlation chip to obtain a GPS signal. The mobile device 122 receives location data from the positioning system. The location data indicates the location of the mobile device 122.

The position circuitry 207 may also include gyroscopes, accelerometers, magnetometers, or any other device for tracking or determining movement of a mobile device. The gyroscope is operable to detect, recognize, or measure the current orientation, or changes in orientation, of a mobile device. Gyroscope orientation change detection may operate as a measure of yaw, pitch, or roll of the mobile device.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a)hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry. In an embodiment, a vehicle may be considered a mobile device, or the mobile device may be integrated into a vehicle.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. These examples may be collectively referred to as a non-transitory computer readable medium.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

The following example embodiments of the invention are also disclosed:

Embodiment 1: A method for automatic identification of roadside objects. The method comprising: identifying, by a processor, one or more voxel occupancy grids associated with a region of a roadway, wherein a voxel occupancy grid of the one or more voxel occupancy grids comprises a plurality of grid voxels; determining, by the processor, occupied voxels closest to the roadway for the plurality of grid voxels of the one or more voxel occupancy grids; generating, by the processor, an object polyline that connects respective pre-defined points of respective occupied voxels closest to the roadway for the one or more voxel occupancy grids; and classifying, by the processor, the generated object polyline as a roadside object.

Embodiment 2: The method of embodiment 1, wherein identifying one or more voxel occupancy grids comprises: receiving point cloud data for the region of the roadway; excluding point cloud data associated with a road surface at the region of the roadway; and identifying a voxel occupancy grid as a portion of the point cloud data associated with a side of the road surface at the region of the roadway.

Embodiment 3: The method of embodiment 1 or 2, further comprising: extracting, by the processor, portions of the one or more voxel occupancy grids based on a size criterion, wherein any voxel occupancy grid having less than a pre-determined number of voxels is discarded.

Embodiment 4: The method of any of the preceding embodiments 1 to 3, wherein extracting portions of the one or more voxel occupancy grids based on a size criterion comprises: extracting grid voxels of the one or more voxel occupancy grids based on a height of the one or more voxel occupancy grids above a road surface at the region of the roadway.

Embodiment 5: The method of any of the preceding embodiments 1 to 4, further comprising: identifying a pre-determined height range; determining a height above the road surface at the region of the roadway for a voxel occupancy grid; and filtering out grid voxels of the voxel occupancy grid that fall outside the predetermined height range.

Embodiment 6: The method of any of the preceding embodiments 1 to 5, wherein determining the height above the road surface at the region of the roadway for the voxel occupancy grid comprises: identifying, for the voxel occupancy grid, a grid corner in closest proximity to the road surface at the region of the roadway; determining a point on the road surface nearest the identified grid corner; and calculating a difference in altitude between the identified grid corner and the determined point on the road surface.

Embodiment 7: The method of any of the preceding embodiments 1 to 6, wherein the one or more voxel occupancy grids comprises a volumetric grid representing a three-dimensional space, wherein a grid voxel of the plurality of grid voxels represents a portion of the three-dimensional space and includes data indicative of a grid voxel occupancy, wherein the grid voxel occupancy indicates whether the portion of the three-dimensional space represented by the grid voxel contains data for an object at the portion of the three-dimensional space.

Embodiment 8: The method of any of the preceding embodiments 1 to 7, wherein generating an object polyline comprises: identifying, by the processor in increasing order in a direction of travel along the roadway, pre-defined points of occupied voxels closest to the roadway for a vertical layer of grid voxels of the one or more voxel occupancy grids; and connecting, by the processor, as an object polyline, the identified pre-defined points of the vertical layer when the pre-defined points are adjacent to and within one voxel distance of each other.

Embodiment 9: The method of any of the preceding embodiments 1 to 8, further comprising: comparing a first object polyline of a first vertical layer of grid voxels to a second object polyline of a second vertical layer of grid voxels, the first and second vertical layers being vertically adjacent one another, the first vertical layer being vertically above the second vertical layer; measuring a similarity between pre-defined points in the first object polyline and pre-defined points in the second object polyline; and discarding the first object polyline when the measured similarity meets or exceeds a predetermined similarity criterion.

Embodiment 10: The method of any of the preceding embodiments 1 to 9, wherein determining occupied voxels closest to the roadway comprises: defining a horizontal plane; defining a first direction as a direction of travel along the roadway, the first direction being in the horizontal plane; defining a second direction as a lateral direction perpendicular to the first direction, the second direction being in the horizontal plane; determining whether each grid voxel of the plurality of grid voxels of the one or more voxel occupancy grids is occupied or unoccupied, wherein an occupied voxel is a grid voxel that represents a portion of a three-dimensional space containing data for an object at the portion of the three-dimensional space, wherein an unoccupied voxel is a grid voxel that represents a portion of the three-dimensional space containing no data for an object at the portion of the three-dimensional space; measuring a distance in the second direction from a nearest edge of the roadway to each determined occupied voxel; and defining, for a row of grid voxels extending in the second direction, a determined occupied voxel with a minimum measured distance in the second direction as an occupied voxel closest to the roadway.

Embodiment 11: The method of any of the preceding embodiments 1 to 10, further comprising: computing object polyline attributes for the generated object polyline; classifying the generated object polyline as noise or a roadside object based on the computed object polyline attributes; storing the computed object polyline attributes and the object polyline classifications in a database; and filtering the generated object polyline based on the computed object polyline attributes and the object polyline classifications.

Embodiment 12: An apparatus, configured to perform and/or control the method of any of embodiments 1-11 or comprising means for performing and/or controlling any of embodiments 1-11.

Embodiment 13: An apparatus, comprising at least one processor and at least one memory including computer program code for one or more programs, the at least one memory and the computer program code configured to, with the at least one processor, to perform and/or control the method of any of embodiments 1-11.

Embodiment 14: A computer program comprising instructions operable to cause a processor to perform and/or control the method of any of embodiments 1-11, when the computer program is executed on the processor.

Embodiment 15: A method for automatic localization, the method comprising: accessing, by a processor, object polylines associated with a region of a roadway, wherein the object polylines represent roadside objects at the region of the roadway, and wherein the object polylines are generated based on occupied voxels closest to the roadway of one or more voxel occupancy grids associated with the region of the roadway; receiving, by the processor, sensor data from a user located at the region of the roadway; comparing, by the processor, the accessed object polylines and the received sensor data; and performing, by the processor, localization of the user located at the region of the roadway based on the comparison.

Embodiment 16: The method of embodiment 15, wherein the object polylines are generated based on one or more voxel occupancy grids associated with the region of the roadway, wherein each voxel occupancy grid of the one or more voxel occupancy grids comprises one or more vertical layers of grid voxels, and wherein pre-defined points of occupied voxels closest to the roadway for the one or more vertical layers of grid voxels are connected to form the object polylines.

Embodiment 17: An apparatus, configured to perform and/or control the method of any of embodiments 15-16 or comprising means for performing and/or controlling any of embodiments 15-16.

Embodiment 18: An apparatus, comprising at least one processor and at least one memory including computer program code for one or more programs, the at least one memory and the computer program code configured to, with the at least one processor, to perform and/or control the method of any of embodiments 15-16.

Embodiment 19: A computer program comprising instructions operable to cause a processor to perform and/or control the method of any of embodiments 15-16, when the computer program is executed on the processor.

Embodiment 20: An apparatus for automatic detection of roadside objects, the apparatus comprising: a communication interface configured to receive a voxel occupancy grid associated with a region of a roadway, wherein the voxel occupancy grid comprises a plurality of grid voxels; and a controller configured to extract portions of the voxel occupancy grid based on a size criterion, determine occupied voxels closest to the roadway in the non-extracted portions of the voxel occupancy grid, and generate, for the non-extracted portions of the voxel occupancy grid, at least one object polyline that represents a roadside object at the region of the roadway.

Embodiment 21: The apparatus of embodiment 20, wherein the controller, to generate the at least one object polyline, is configured to connect respective pre-defined points of respective occupied voxels closest to the roadway for the non-extracted portions of the voxel occupancy grid.

Embodiment 22: The apparatus of embodiment 20 or 21, wherein the controller, to connect the respective pre-defined points of respective occupied voxels, is configured to connect, as an object polyline, pre-defined points when the pre-defined points are adjacent to and within one voxel distance of each other.

Embodiment 23: The apparatus of any of the preceding embodiments 20 to 22, wherein the controller is further configured to compare a first object polyline of a first vertical layer of grid voxels to a second object polyline of a second vertical layer of grid voxels, the first and second vertical layers being vertically adjacent one another, the first vertical layer being vertically above the second vertical layer, and discard the first object polyline when a measured similarity between pre-defined points in the first and second object polylines meets or exceeds a predetermined similarity criterion.

Embodiment 24: The apparatus of any of the preceding embodiments 20 to 23, wherein the controller, to extract portions of the voxel occupancy grid based on a size criterion, is configured to discard any voxel occupancy grid having less than a predetermined number of voxels or extract grid voxels of the voxel occupancy grid based on a height of the voxel occupancy grid above a road surface at the region of the roadway.

Embodiment 25: The apparatus of any of the preceding embodiments 20 to 24, wherein the controller is configured to extract grid voxels of the voxel occupancy grid having a height that does not fall within a predetermined height range above the road surface at the region of the roadway.

Embodiment 26: An apparatus for automatic localization, the apparatus comprising: a database configured to store object polylines associated with a region of a roadway, wherein the object polylines represent roadside objects at the region of the roadway; a communication interface configured to receive sensor data from a user located at the region of the roadway; and a controller configured to compare the stored object polylines and the received sensor data and perform localization of the user located at the region of the roadway based on the comparison.

We claim:

1. A method for automatic identification of roadside objects, the method comprising:
    identifying, by a processor, one or more voxel occupancy grids associated with a region of a roadway, wherein a voxel occupancy grid of the one or more voxel occupancy grids comprises a plurality of grid voxels arranged in a plurality of vertical layers, each vertical layer comprising grid voxels adjacent one another in a horizontal plane;
    determining, by the processor, occupied voxels closest to an edge of the roadway for respective horizontal planes for more than one vertical layer of the plurality of vertical layers of the plurality of grid voxels of the one or more voxel occupancy grids;
    generating, by the processor, an object polyline that connects respective pre-defined points of respective occupied voxels closest to the edge of the roadway for the respective horizontal planes of the more than one vertical layer of the plurality of vertical layers of the one or more voxel occupancy grids, the object polyline representing a roadway-facing geometry of an object; and
    classifying, by the processor, the generated object polyline as a roadside object.

2. The method of claim 1, wherein identifying one or more voxel occupancy grids comprises:
    receiving point cloud data for the region of the roadway;
    excluding point cloud data associated with a road surface at the region of the roadway; and
    identifying a voxel occupancy grid as a portion of the point cloud data associated with a side of the road surface at the region of the roadway.

3. The method of claim 1, further comprising:
    extracting, by the processor, portions of the one or more voxel occupancy grids based on a size criterion, wherein any voxel occupancy grid having less than a predetermined number of voxels is discarded.

4. The method of claim 3, wherein extracting portions of the one or more voxel occupancy grids based on a size criterion comprises:
    extracting grid voxels of the one or more voxel occupancy grids based on a height of the one or more voxel occupancy grids above a road surface at the region of the roadway.

5. The method of claim 4, further comprising:
    identifying a predetermined height range;
    determining a height above the road surface at the region of the roadway for a voxel occupancy grid; and
    filtering out grid voxels of the voxel occupancy grid that fall outside the predetermined height range.

6. The method of claim 5, wherein determining the height above the road surface at the region of the roadway for the voxel occupancy grid comprises:
    identifying, for the voxel occupancy grid, a grid corner in closest proximity to the road surface at the region of the roadway;
    determining a point on the road surface nearest the identified grid corner; and calculating a difference in altitude between the identified grid corner and the determined point on the road surface.

7. The method of claim 1, wherein the one or more voxel occupancy grids comprises a volumetric grid representing a three-dimensional space, wherein a grid voxel of the plurality of grid voxels represents a portion of the three-dimensional space and includes data indicative of a grid voxel occupancy, wherein the grid voxel occupancy indicates whether the portion of the three-dimensional space represented by the grid voxel contains data for the object at the portion of the three-dimensional space.

8. The method of claim 1, wherein generating an object polyline comprises:
identifying, by the processor in increasing order in a direction of travel along the roadway, pre-defined points of occupied voxels closest to the roadway for a vertical layer of grid voxels of the plurality of vertical layers of the one or more voxel occupancy grids; and
connecting, by the processor, as the object polyline, the identified pre-defined points of the vertical layer when the pre-defined points are adjacent to and within one voxel distance of each other.

9. The method of claim 1, further comprising:
comparing a first object polyline of a first vertical layer of the plurality of vertical layers of grid voxels to a second object polyline of a second vertical layer of the plurality of vertical layers of grid voxels, the first and second vertical layers being vertically adjacent one another, the first vertical layer being vertically above the second vertical layer;
measuring a similarity between pre-defined points in the first object polyline and pre-defined points in the second object polyline; and
discarding the first object polyline when the measured similarity meets or exceeds a predetermined similarity criterion.

10. The method of claim 1, wherein determining occupied voxels closest to an edge of the roadway comprises:
defining a horizontal plane;
defining a first direction as a direction of travel along the roadway, the first direction being in the horizontal plane;
defining a second direction as a lateral direction perpendicular to the first direction, the second direction being in the horizontal plane;
determining whether each grid voxel of the plurality of grid voxels of the one or more voxel occupancy grids is occupied or unoccupied, wherein an occupied voxel is a grid voxel that represents a portion of a three-dimensional space containing data for one or more objects at the portion of the three-dimensional space, wherein an unoccupied voxel is a grid voxel that represents a portion of the three-dimensional space containing no data for any object at the portion of the three-dimensional space;
measuring a distance in the second direction from a nearest edge of the roadway to each determined occupied voxel; and
defining, for a row of grid voxels extending in the second direction, a determined occupied voxel with a minimum measured distance in the second direction as an occupied voxel closest to the roadway.

11. The method of claim 1, further comprising:
computing object polyline attributes for the generated object polyline;
classifying the generated object polyline as noise or the roadside object based on the computed object polyline attributes;
storing the computed object polyline attributes and the object polyline classifications in a database; and
filtering the generated object polyline based on the computed object polyline attributes and the object polyline classifications.

12. An apparatus for automatic detection of roadside objects, the apparatus comprising:
a communication interface configured to receive a voxel occupancy grid associated with a region of a roadway, wherein the voxel occupancy grid comprises a plurality of grid voxels arranged in a plurality of vertical layers, each vertical layer comprising grid voxels adjacent one another in a horizontal plane; and
a controller configured to extract portions of the voxel occupancy grid based on a size criterion, determine occupied voxels closest to an edge of the roadway for respective horizontal planes for more than one vertical layer of the plurality of vertical layers of the plurality of grid voxels in the non-extracted portions of the voxel occupancy grid, and generate, for the respective horizontal planes of the more than one vertical layer of the plurality of vertical layers of the non-extracted portions of the voxel occupancy grid, at least one object polyline that represents a roadway-facing geometry of a roadside object at the region of the roadway.

13. The apparatus of claim 12, wherein the controller, to generate the at least one object polyline, is configured to connect respective pre-defined points of respective occupied voxels closest to the edge of the roadway for the more than one vertical layer of the plurality of vertical layers of the non-extracted portions of the voxel occupancy grid.

14. The apparatus of claim 13, wherein the controller, to connect the respective pre-defined points of respective occupied voxels, is configured to connect, as an object polyline, pre-defined points when the pre-defined points are adjacent to and within one voxel distance of each other.

15. The apparatus of claim 12, wherein the controller is further configured to compare a first object polyline of a first vertical layer of the plurality of vertical layers of grid voxels to a second object polyline of a second vertical layer of the plurality of vertical layers of grid voxels, the first and second vertical layers being vertically adjacent one another, the first vertical layer being vertically above the second vertical layer, and discard the first object polyline when a measured similarity between pre-defined points in the first and second object polylines meets or exceeds a predetermined similarity criterion.

16. The apparatus of claim 12, wherein the controller, to extract portions of the voxel occupancy grid based on a size criterion, is configured to discard any voxel occupancy grid having less than a predetermined number of voxels or extract grid voxels of the voxel occupancy grid based on a height of the voxel occupancy grid above a road surface at the region of the roadway.

17. The apparatus of claim 16, wherein the controller is configured to extract grid voxels of the voxel occupancy grid having a height that does not fall within a predetermined height range above the road surface at the region of the roadway.

* * * * *